(12) United States Patent　　　　(10) Patent No.:　US 12,561,333 B2
Gottin et al.　　　　　　　　　　　　(45) Date of Patent: 　　Feb. 24, 2026

---

(54) WEIGHTED TRAJECTORY SIMILARITY DETERMINATION BASED ON SUB-TRAJECTORY QUERYING

(71) Applicant: Dell Products L.P., Round Rock, TX (US)

(72) Inventors: Vinicius Michel Gottin, Rio de Janeiro (BR); Paulo Abelha Ferreira, Rio de Janeiro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 18/160,601

(22) Filed: Jan. 27, 2023

(65) Prior Publication Data

US 2024/0256557 A1　　Aug. 1, 2024

(51) Int. Cl.
　　G06F 16/2457　　(2019.01)
　　G01C 21/20　　　(2006.01)
　　G01C 21/34　　　(2006.01)

(52) U.S. Cl.
　　CPC ..... G06F 16/24578 (2019.01); G01C 21/206 (2013.01); G01C 21/3446 (2013.01); G06F 16/24575 (2019.01)

(58) Field of Classification Search
　　CPC ......... G06F 16/24578; G06F 16/24575; G06F 16/29; G01C 21/206; G01C 21/3446
　　USPC .......................................................... 701/23
　　See application file for complete search history.

(56) References Cited

U.S. PATENT DOCUMENTS

| | | | |
|---|---|---|---|
| 10,946,519 B1 | 3/2021 | Prats | |
| 2007/0005240 A1* | 1/2007 | Oumi ............... | G08G 1/096888 |
| | | | 701/425 |
| 2009/0248301 A1* | 10/2009 | Judd ................... | G01C 21/1652 |
| | | | 701/466 |
| 2012/0143504 A1 | 6/2012 | Kalai et al. | |
| 2013/0260791 A1 | 10/2013 | Malinovskiy et al. | |
| 2014/0115507 A1* | 4/2014 | Bailey ................ | G01C 21/3697 |
| | | | 715/764 |
| 2014/0148970 A1* | 5/2014 | Dufford ................... | B60L 58/12 |
| | | | 701/1 |
| 2017/0030723 A1 | 2/2017 | Ding et al. | |
| 2017/0248964 A1* | 8/2017 | Kentley ................ | G01S 7/4972 |
| 2017/0344855 A1* | 11/2017 | Mande ................... | G06V 20/58 |

(Continued)

OTHER PUBLICATIONS

A. Mueen et al, "The Fastest Similarity Search Algorithm for Time Series Subsequences under Euclidean Distance," URL: http://www. cs.unm.edu/~mueen/FastestSimilaritySearch.html, 2022.

(Continued)

*Primary Examiner* — Krishnan Ramesh
(74) *Attorney, Agent, or Firm* — Workman Nydegger

(57)　　　　　　ABSTRACT

Querying trajectories is disclosed. A database of rich typical trajectories, which includes both position and attribute information for each of the typical trajectories, is created. Using a current trajectory of a node or a current position of the node, the database is queried for a rich typical trajectory that likely corresponds to the current or anticipated trajectory of the node. The database is searched by identifying candidate trajectories and determining a similarity score for each of the candidate trajectories. The best scoring candidate trajectory may be returned and logistics operations may be performed using the best scoring candidate trajectory.

20 Claims, 22 Drawing Sheets

(56)          References Cited

U.S. PATENT DOCUMENTS

| 2018/0188049 A1* | 7/2018 | Shi | G01C 21/3484 |
| 2019/0294524 A1* | 9/2019 | Gupta | G06F 11/364 |
| 2020/0019585 A1* | 1/2020 | Balu | G06F 16/287 |
| 2020/0033857 A1* | 1/2020 | Yu | H04W 4/38 |
| 2020/0209006 A1* | 7/2020 | Iwano | G01C 21/3492 |
| 2021/0081559 A1* | 3/2021 | Gratton | H04W 4/02 |
| 2022/0307859 A1* | 9/2022 | Zou | G01C 21/3848 |
| 2023/0045727 A1* | 2/2023 | Wang | G06Q 30/0265 |
| 2023/0074873 A1* | 3/2023 | Sredzki | B60W 30/09 |
| 2023/0078653 A1* | 3/2023 | Yang | G01C 21/3484 |
|  |  |  | 701/533 |
| 2024/0053167 A1 | 2/2024 | Karavas |  |
| 2024/0060781 A1* | 2/2024 | Yan | G01C 21/30 |

OTHER PUBLICATIONS

H. Wu, Z. Xu and G. Wu, "A Novel Method of Missing Road Generation in City Blocks Based on Big Mobile Navigation Trajectory Data," ISPRS Int. J. Geo-Inf., 2019.
Gottin, et al, U.S. Appl. No. 17/585,055, "Edge-Enabled Trajectory Map Generation", filed Jan. 26, 2022.

* cited by examiner

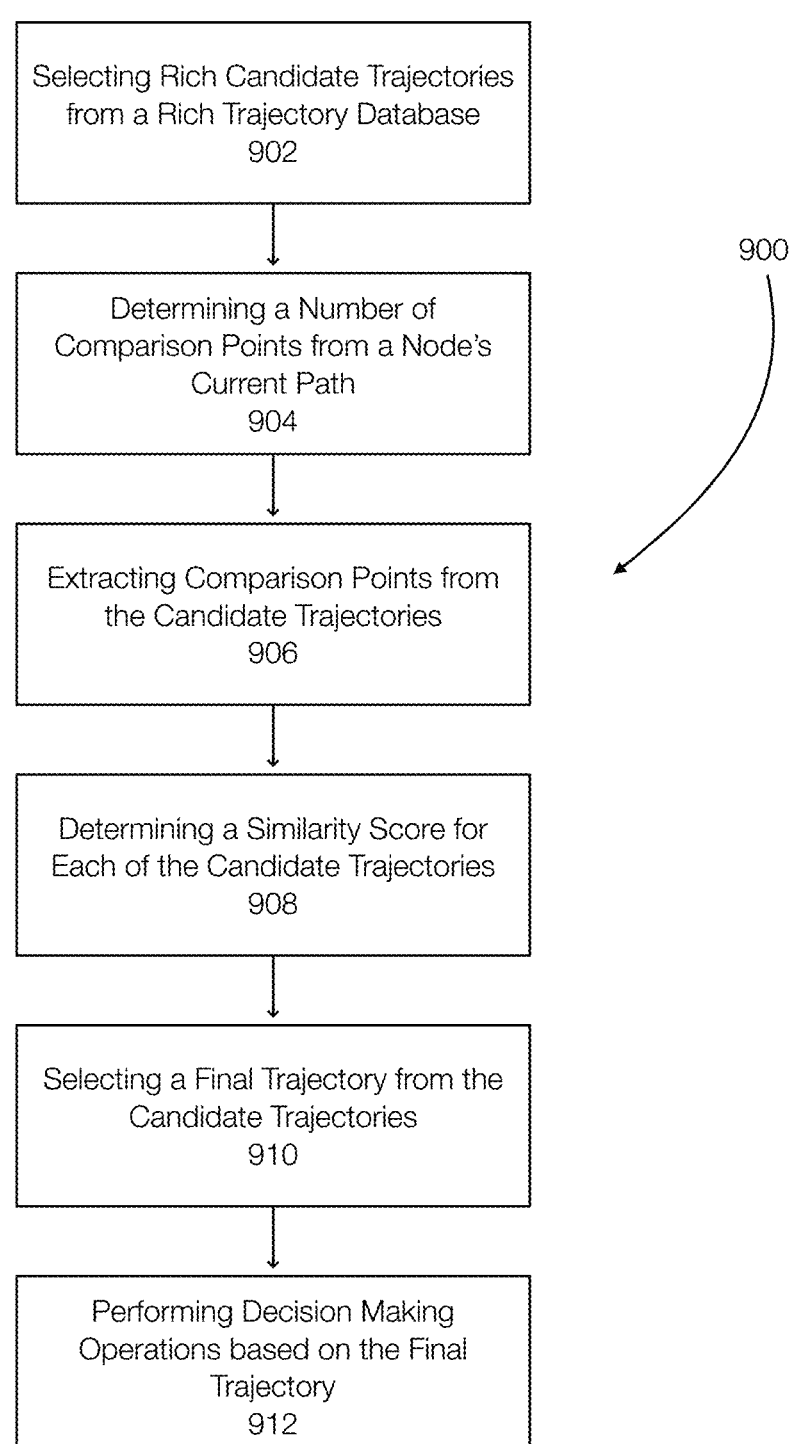

Selecting Rich Candidate Trajectories
from a Rich Trajectory Database
902

Determining a Number of
Comparison Points from a Node's
Current Path
904

Extracting Comparison Points from
the Candidate Trajectories
906

Determining a Similarity Score for
Each of the Candidate Trajectories
908

Selecting a Final Trajectory from the
Candidate Trajectories
910

Performing Decision Making
Operations based on the Final
Trajectory
912

Memory
1002

NVRAM
1004

Processor
1006

Application(s)
1014

Storage Media
1008

UI Device
1110

Data Storage
1112

WEIGHTED TRAJECTORY SIMILARITY DETERMINATION BASED ON SUB-TRAJECTORY QUERYING

FIELD OF THE INVENTION

Embodiments of the present invention generally relate to logistics systems and logistics operations. More particularly, at least some embodiments of the invention relate to systems, hardware, software, computer-readable media, and methods for querying trajectories of nodes in an environment or domain and performing logistics operations including decision making operations based on the queries.

BACKGROUND

In many environments or domains, such as warehouses, there is a need to manage logistics. More specifically, many types of devices operate in these environments. Some of the devices may be controlled by a user/driver while other devices may be autonomous. When devices such as forklifts and autonomous mobile robots are operating in these environments, there is a need to perform logistics operations, which may include decision making operations. These decisions are often made in the context of logistics operations such as warehouse management and safety operations.

These actions performed on the results of a query may also be made based on sensors that are deployed on the devices themselves. These sensors, for example, may provide data that allows a device's position, speed, orientation, and trajectory to be monitored/determine in real time or nearly real time. Logistics operations and decisions in this context, however, may still lag behind real-time conditions. Logistics operations could be improved if various characteristics of these devices, such as position or trajectory, can be anticipated. This would allow decisions and actions to be made more efficiently and more quickly.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 9 discloses aspects of querying a database of rich trajectories; and

DETAILED DESCRIPTION OF SOME EXAMPLE EMBODIMENTS

Figure 1:
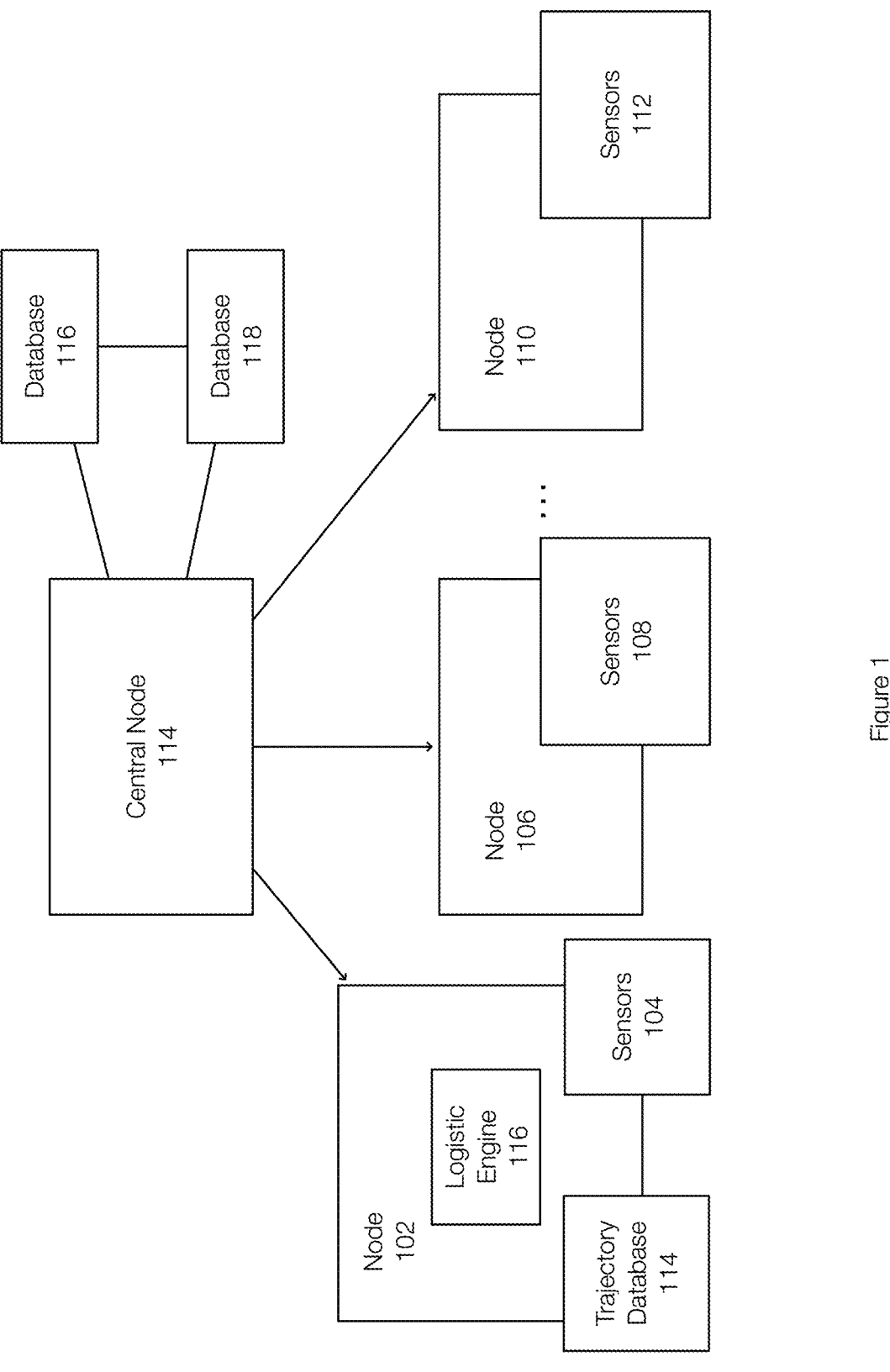
FIG. 1 discloses aspects of a domain in which nodes operate.

Embodiments of the present invention generally relate to logistics and logistics operations, and trajectories. More particularly, at least some embodiments of the invention relate to systems, hardware, software, computer-readable media, and methods for determining trajectories of devices operating in an environment. Embodiments of the invention further relate to querying databases that store typical trajectories.

Conventionally, the ability to access historical trajectories to determine a likely current trajectory of a device lead to inconsistent results. For example, in certain situations, the projected trajectory may alternate between different trajectories that are considered to be distinct.

For example, two distinct trajectories may have a common straight portion. At an upcoming position, one of the trajectories expects a left turn while the other trajectory expects a right turn. Changes in the device's current position and current path or trajectory may cause a decision engine to expect the first trajectory and then, a short time later, expect the second trajectory. This type of uncertainty can complicate a decision making process as a first action or decision may be determined if the device turns left and a second action or decision different from the first action may be determined if the device turns right. The inability to more accurately determine or predict the current expected or typical trajectory may impact the actual operation of the device and may lead, by way of example, to an unsafe outcome.

Embodiments of the invention relate to querying a trajectory database to determine an expected or anticipated trajectory of a device. In one example, historical trajectories for multiple devices may be used to generate the trajectory database. Many of these trajectories may share common portions or may overlap with each other. The historical trajectories may be processed to generate typical device trajectories. The typical trajectories are converted to rich typical trajectories by associating them with attribute data. When querying the database, the query can be used to identify candidate trajectories, determine a similarity score for each of the candidate trajectories, and return a final trajectory that has the best similarity score. When generated the similarity score, aspects of the trajectories and/or their attributes can be weighted.

Embodiments of the invention relate to querying a trajectory database to robustly determine a typical current trajectory that is likely to be the trajectory followed by the device. This approach uses the short-term history of positioning and sensor data from the device to determine the device's likely trajectory from a set or database of known typical trajectories. Embodiments of the invention further leverage device attributes that may be derived from sensor data to determine the likely trajectory of the device. When selecting or choosing from multiple trajectories, embodiments of the invention allow the trajectories to be weighted using, in some examples, the device's attributes or characteristics.

Embodiments of the invention thus relate to systems and methods for performing queries for robustly determining a current typical trajectory, which may correspond to the device's actual or anticipated trajectory. Embodiments of the invention provide a mechanism that allows a weighted similarity of previous points in the current path of the device to be compared with points in the trajectories being queried. The selection or identification of a typical similar trajectory may use a similarity score that reflects the similarity in position and/or similarity in attributes of the trajectories being queried.

FIG. 1 discloses aspects of collecting data from devices (referred to herein as nodes) operating in an environment or domain. Examples of nodes include forklifts, autonomous mobile robots, or the like. As used herein nodes may refer to the devices themselves and/or to computing resources associated with or included in the node. For example, a node such as an autonomous mobile robot may include processors, memory, networking hardware, and the like. The node may be configured with sensors such as position sensors, inertial sensors, direction sensors, and the like. The collection of sensors associated with a node may depend on the node. A forklift, for example, may include sensors related to mast height, mast position, load weight, and the like.

Data collected from a node's sensors can be correlated. Further, the collection of data from the sensors may be performed on command, periodically, and/or in response to an event. For example, detecting acceleration/deceleration may cause data to be collected.

FIG. 1 discloses aspects of a domain in which nodes operate. An example domain is a warehouse or other environment. FIG. 1 illustrates nodes 102, 106, and 110, which are associated with, respectively, sensors 104, 108, and 112. Data collected from the sensors 104, 108, and 112 may be transmitted to a central node 114 and stored in a database 116. The data stored in the database 116 include trajectory data, sensor data, position data, or the like or combinations thereof. The trajectory data may correspond to collections of position data. For example, multiple positions may define a path or trajectory. The data stored in the database 116 may be used to train machine learning models, generate inferences from machine learning models or the like. The nodes 102, 106, and 110 may also include models that may generate inferences using locally generated and/or collected data. The inferences generated by the models may be used in decision making operations by the central node 114 and/or at the nodes 102, 106, and 110.

In this example, a model such as a logistics engine 116 is illustrated. Other nodes may be similarly configured. In this example, the logistics engine 116 is configured to query the trajectory database 114. Querying the trajectory database 114 is performed to determine the most likely trajectory of the node 102. The query may include data obtained from the sensors 104. For example, a current or most recent position of the device may be used to identify candidate trajectories from the trajectory database. The candidate trajectories may then be processed to identify a final trajectory that may be used by the logistic engine 116 to generate inference or perform other logistics operations. The inference may be used in decision making operations.

The nodes in a domain, represented by the nodes 102, 106, and 110, are an example of a set of entities ($\mathbb{E}$). For each node $E_i \in \mathbb{E}$, sequences of collections of data are obtained. Each collection may correspond to a position of the node and or a timestamp. A distance function can determine a distance between any two positions. The distance may be a Euclidean distance, determined from GPS coordinates, RFID based, or the like. The manner in which distance is determined may depend on how the position is determined. In some examples, the position of a node may be determined using sensors that are external to the node.

Figure 2:
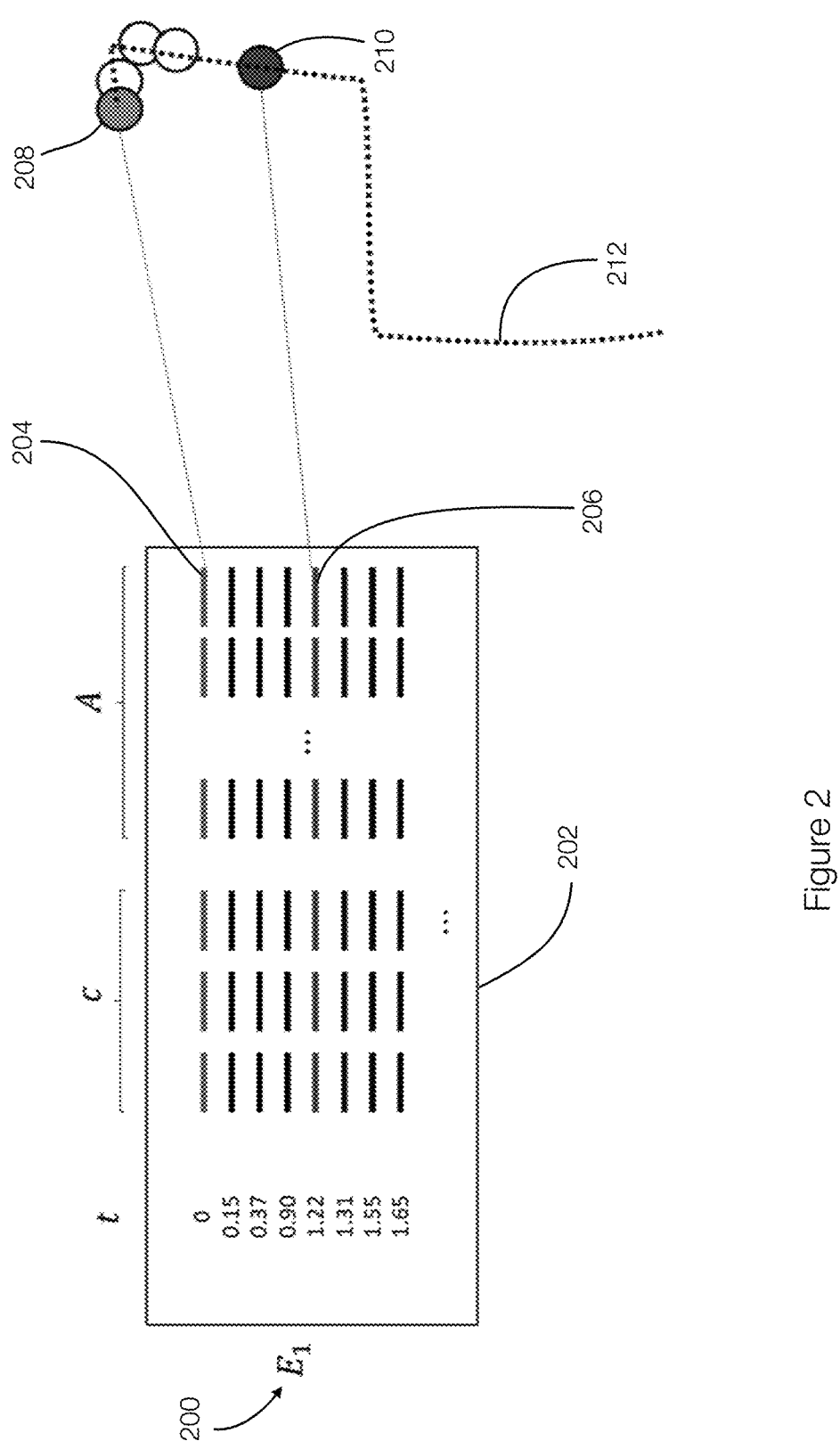
FIG. 2 discloses aspects of sequences of collections of data from a node operating in a domain.

FIG. 2 discloses examples of sequences of collections of data from a node operating in a domain. FIG. 2 illustrates sequences 202 of collections of data for a node 200 ($E_1$). Each collection (t, c, A) includes positioning data (c), and attributes (A) collected t instant (t). The collection 204 is associated with a position 208 of a trajectory 212 and the collection 206 is associated with a position 210 of the trajectory 212. Each of the collections in the sequences 202 is associated with at time or a timestamp.

As illustrated in FIG. 2, the sequences of collections defines the movement of the node 202 in the domain. Embodiments of the invention may use the sequences 202, in combination with attributes of the node 200, to determine rich trajectories. Rich trajectories, by way of example, include sequences of coherent positioning and attribute data. Thus, the database 116 may store data corresponding to trajectories of nodes in the domain.

More specifically, the data stored in the database 116 may be organized into trajectories and stored in a trajectory database 118. This allows a set of trajectories ($E_i^1$, $E_i^2$, . . . ) to be generated for each node $E_i$. The set of trajectories for all nodes is denoted as $\mathbb{E}$. Each set of trajectories may include a sequence of collections corresponding to a specific trajectory.

The sequences of collections may be divided into distinct trajectories by identifying breaks, stops, gaps, and other characteristics that logically suggest distinct trajectories or that suggest a place at which a trajectory may be segmented.

In one example, the sequences of collections may be segmented using temporal and spatial criteria. Thus, trajectories can be identified by the sequences of collections of data using these criteria. From a temporal perspective, a maximum time difference $\delta^t$ is defined between two sequential collections (t, c, A) and (t', c', A') such that a difference $|t'-t| > \delta^t$ determines a break.

For the spatial aspects of trajectory segmentation, a dual criteria is considered. The first criteria relates to gaps in the collection. In one example, a parameter $\delta^d$ is defined to represent the minimum distance between two sequential collections for them to compose or be part of the same segmentation or the same trajectory. The second criteria relates to stops. A stop relates to a scenario where a sequence of collections indicates no changes in positioning for a period of time. The determination of a stop may be based on repeated position data. For example, the determination may be performed for collections (t, c, A), (t', c', A'), for t<t'.

Figure 3A:
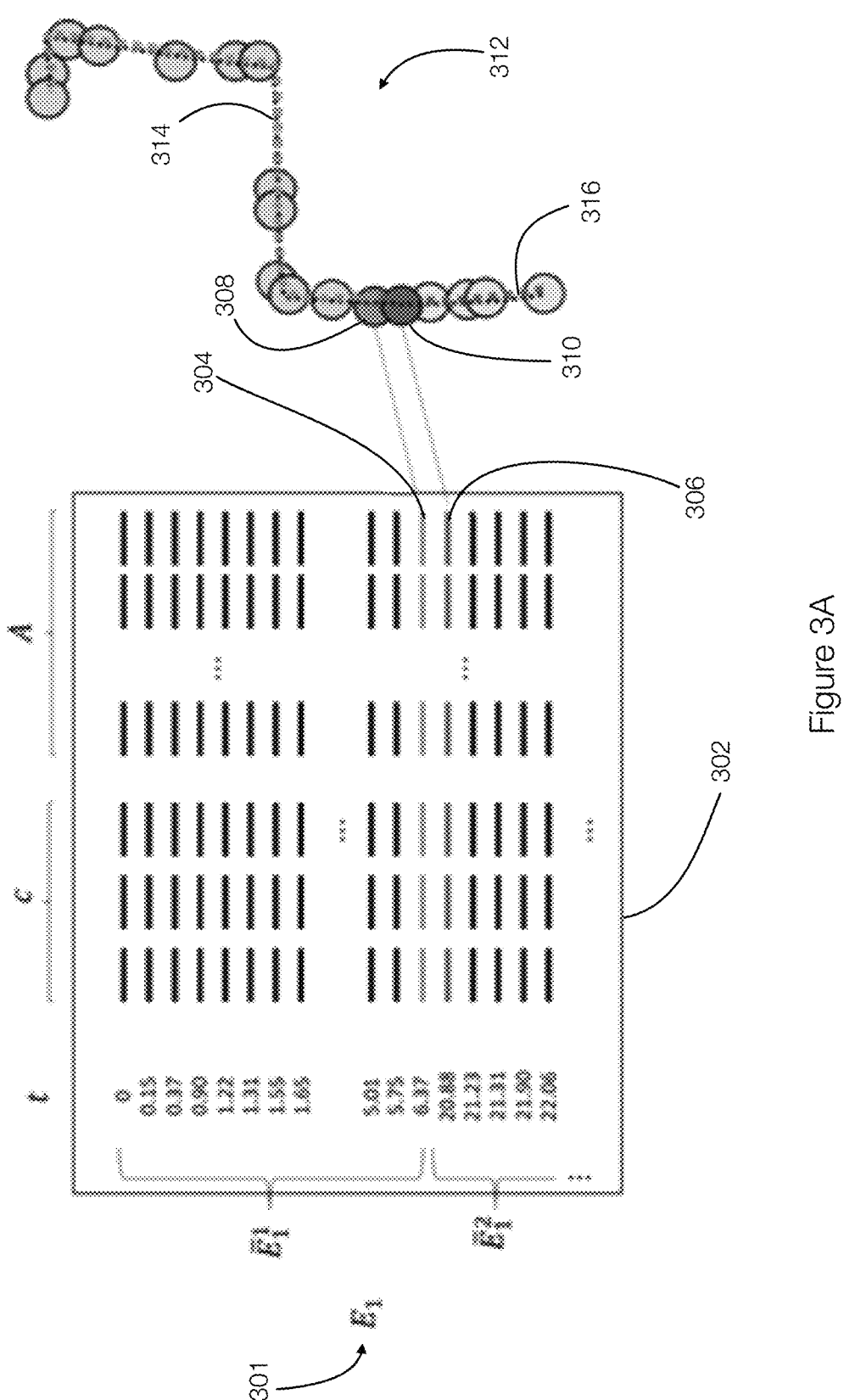
FIGS. 3A, 3B, and 3C disclose aspects of segmenting trajectories.
Figure 3B:
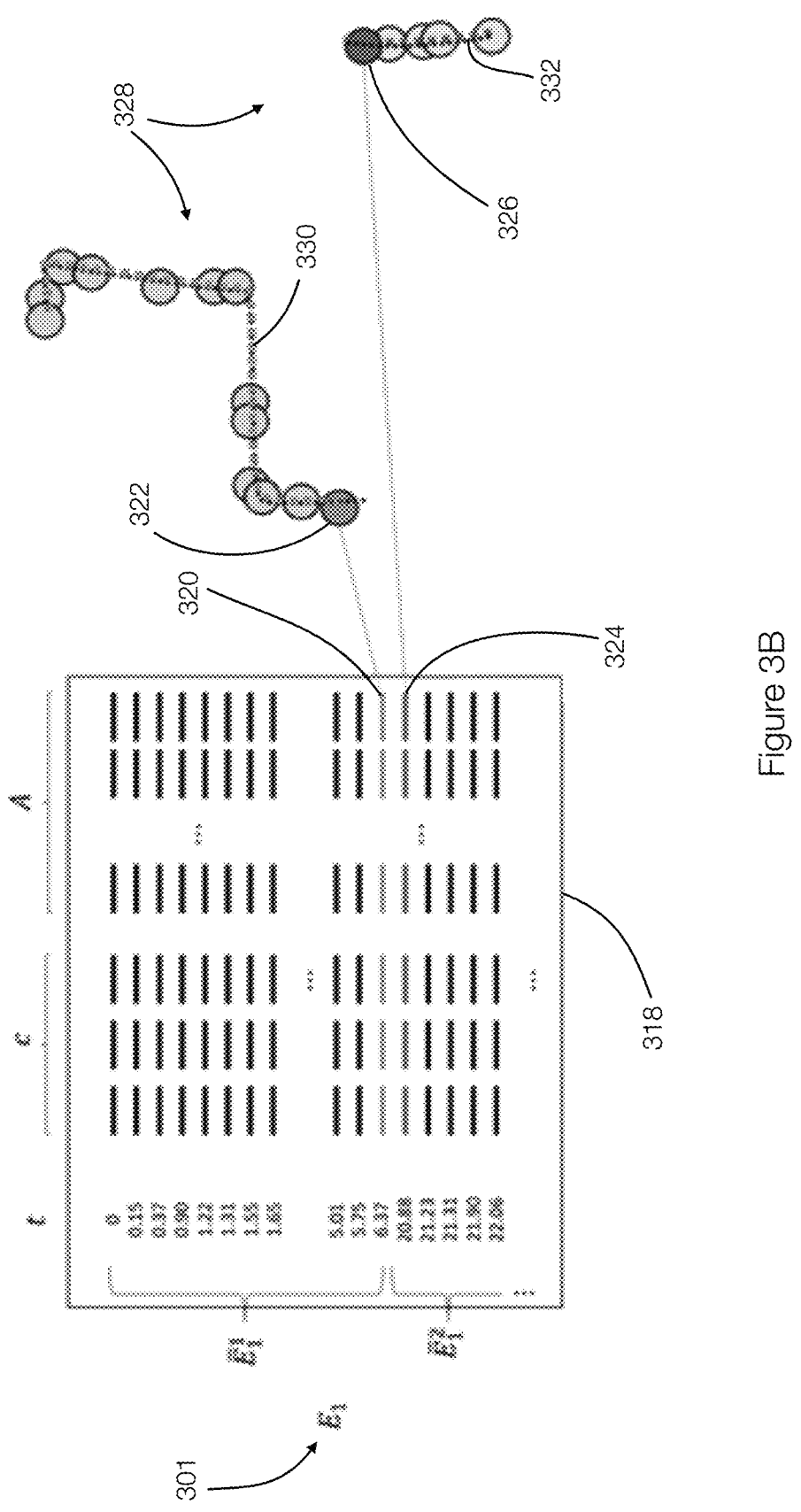
Figure 3C:
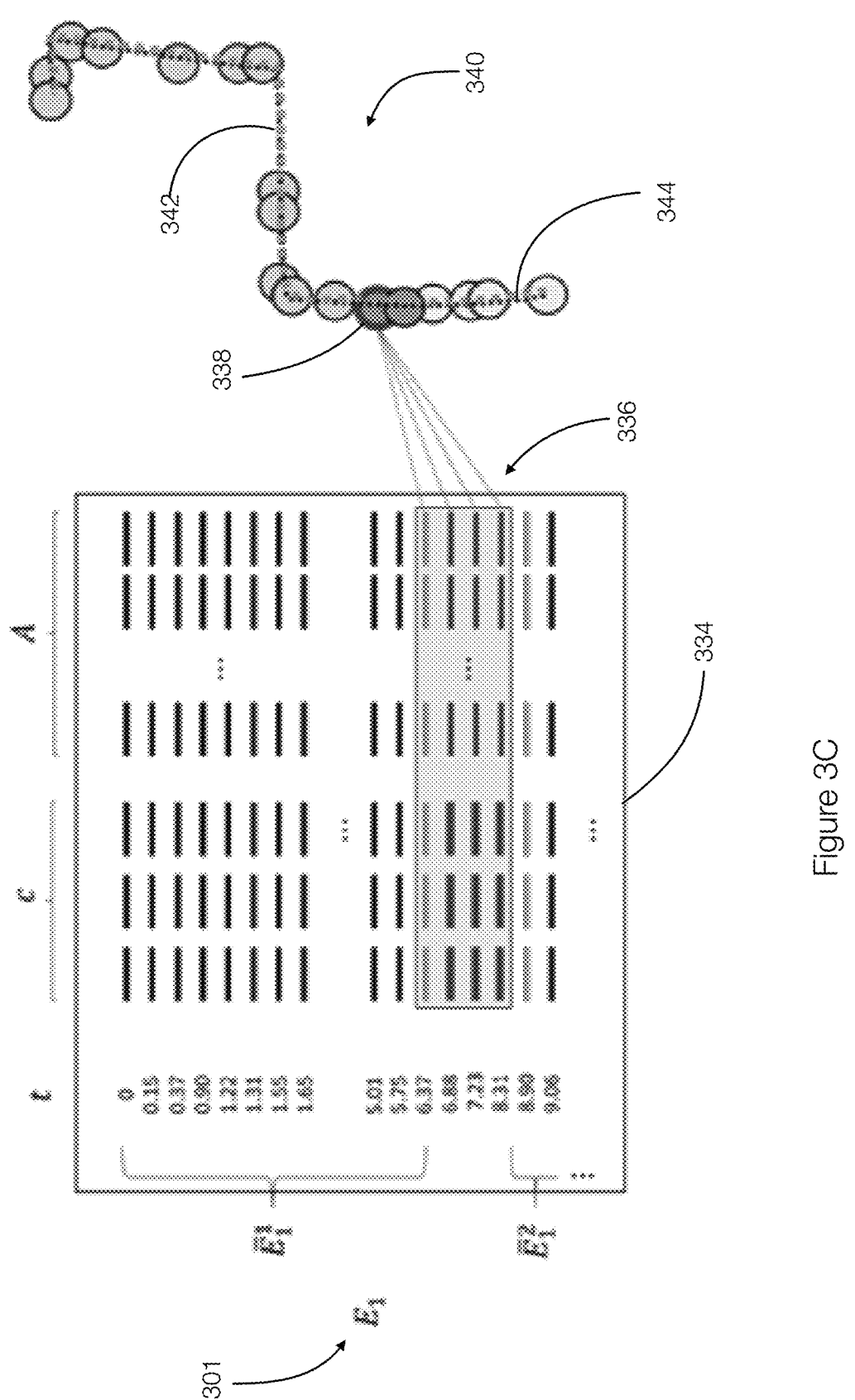

FIGS. 3A-3C disclose aspects of trajectory segments defined by or determined from positioning and timestamp data. FIG. 3A illustrates aspects of segmenting a trajectory 312 based on timestamps or time differences. More specifically, FIG. 3A illustrates sequences 302 of collections for a node ($E_1$) 301. An analysis of the sequences 302 generates two sets of trajectories $\bar{E}_1^1$, $\bar{E}_1^2$ for the node 301. A break is identified between the collection 304 and the collection 306, which correspond respectively to the positions 308 and 310 in the trajectory 312. The break may be based on the timestamps included in the positions 308 and 310 and the maximum time difference $\delta^t$. In this example, the difference between the two timestamps (20.88−6.37) is greater than the maximum time difference. Identifying the break allows two trajectories (or sub-trajectories or segments) 314 and 316 to be identified. Thus, the trajectory 312 is segmented into the trajectories 314 and 316.

FIG. 3B illustrates aspects of segmenting a trajectory 328 based on a gap in the positioning data. The sequences 318 include collections for the node 301. An analysis of the sequences 318 generates two sets of trajectories $\overline{E}_1^1, \overline{E}_1^2$ for the node 301 in FIG. 3B. In this example, a gap is identified between the positions 322 and 326 using the corresponding collections 320 and 324. The gap is determined because a distance between the positions 322 and 326 is greater than a minimum or threshold distance 84. Identifying the gap in the trajectory 328 allows the trajectory 328 to be segmented into the trajectories 330 and 332.

FIG. 3C discloses aspects of segmenting a trajectory 340 based on a stop. The sequences 334 include collections for the node 301. An analysis of the sequences 334 generates two sets of trajectories $\overline{E}_1^1, \overline{E}_1^2$ for the node 301 in FIG. 3C. As illustrated, the collections 336 are not necessarily included in either of the sets of trajectories ($\overline{E}_1^1, \overline{E}_1^2$) included in the sequences 334. An analysis of the sequences 334 further determines that the collections 336 are all associated with the position 338. In other words, the collections 336 all have the same positioning value (c) (or substantially the same positioning value) and different time-stamps. Identifying the stop defined by the collections 336 allows the trajectory 340 to be segmented into the trajectories 342 and 344.

Figure 3D:
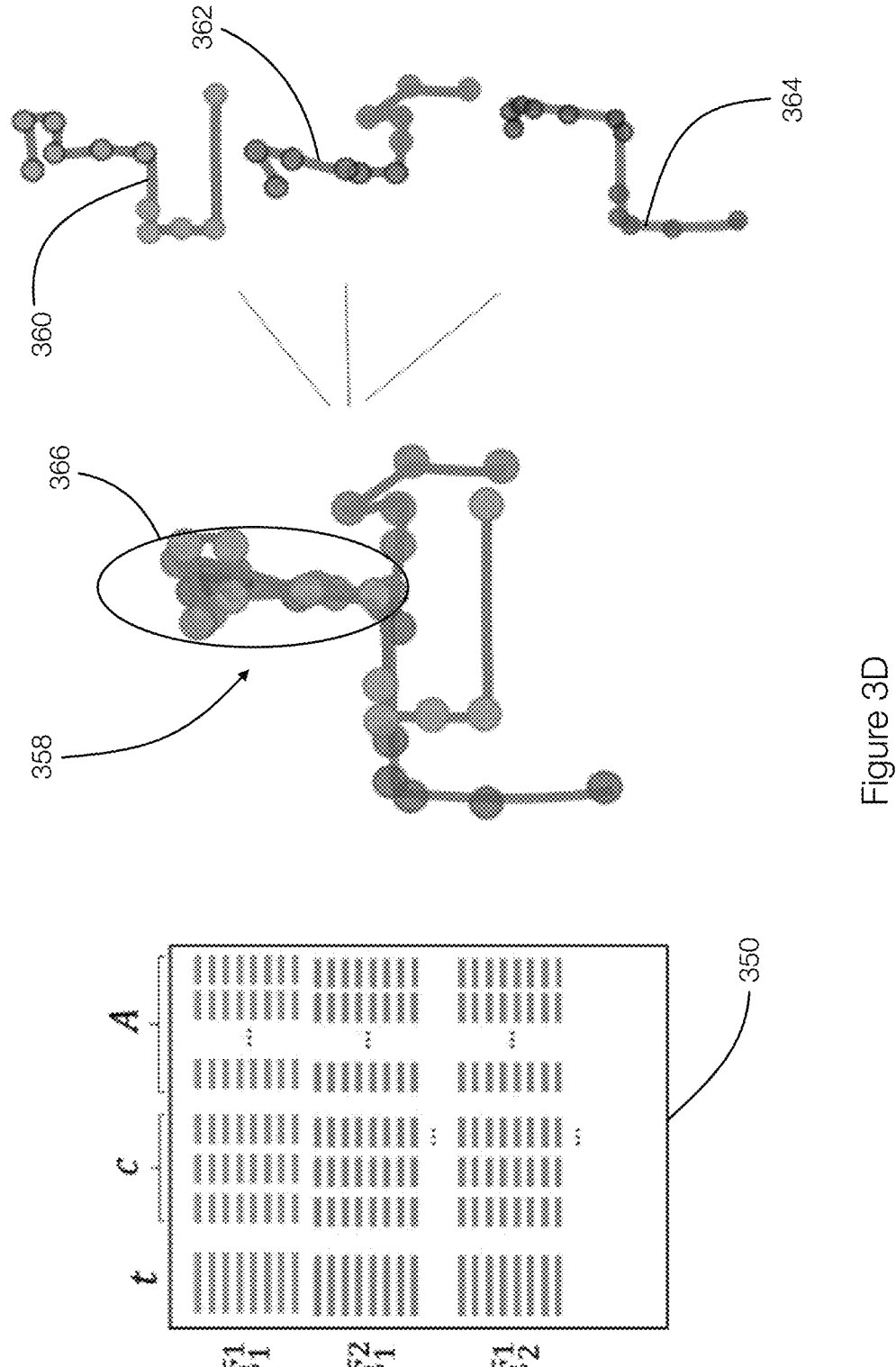
FIG. 3D discloses aspects of shared sub-trajectories.

FIG. 3D discloses aspects of sub-trajectories extracted from trajectories associated with different nodes. FIG. 3D illustrates sequences 350 of collections. In FIG. 3D, the collections 352 and 354 ($\overline{E}_1^1$) and ($\overline{E}_1^2$) are associated with a first node and the collections 356 ($\overline{E}_2^1$) re associated with a second node. The collections 352 define the trajectory 360, the collections 354 define the trajectory 362, and the collections 356 define the trajectory 364. The overlay 358 illustrates the trajectories 360, 362, and 364 in an overlaid manner and the overlay 358 illustrates that the trajectories 360, 362, and 364 have overlapping portions.

The shared portion (sub-trajectory 366) includes the shared or overlapping positions from the trajectories 360, 362, and 364. The sub-trajectory 366 is associated with a support score, in this example, of 3. In this example, the support score represents how many different trajectories share the sub-trajectory 366. A relative frequency can be computed with the support score (s). The relative frequency is defined as the support score divided by the set of nodes or entities $$\left(\frac{s}{|E|}\right)$$

that performed a trajectory containing the sub-trajectory. The relative frequency indicates how relevant the sub-trajectory is to the nodes the performed the sub-trajectory.

In the example of FIG. 3D, all of the trajectories for the node ($E_2$) include the sub-trajectory 366. All of the trajectories for the node ($E_1$) include the sub-trajectory 366 in this example. However, the sequences 350 could also include other trajectories represented by $\overline{E}_1^3, \overline{E}_1^4$, and c that are not represented in the sub-trajectory 366 When these additional trajectories are considered, only 1 in 4 of the trajectories for the node $E_2$ include the sub-trajectory 366 and only 2 of 4 of the trajectories for the node $E_1$ include the sub-trajectory 366. As a result, a lower relative frequency score will be assigned to the sub-trajectory 366.

As illustrated in FIGS. 3A-3D, sequences of collections can be analyzed to identify trajectories, segment trajectories, and/or identify shared trajectories or shared sub-trajectories.

Figure 4A:
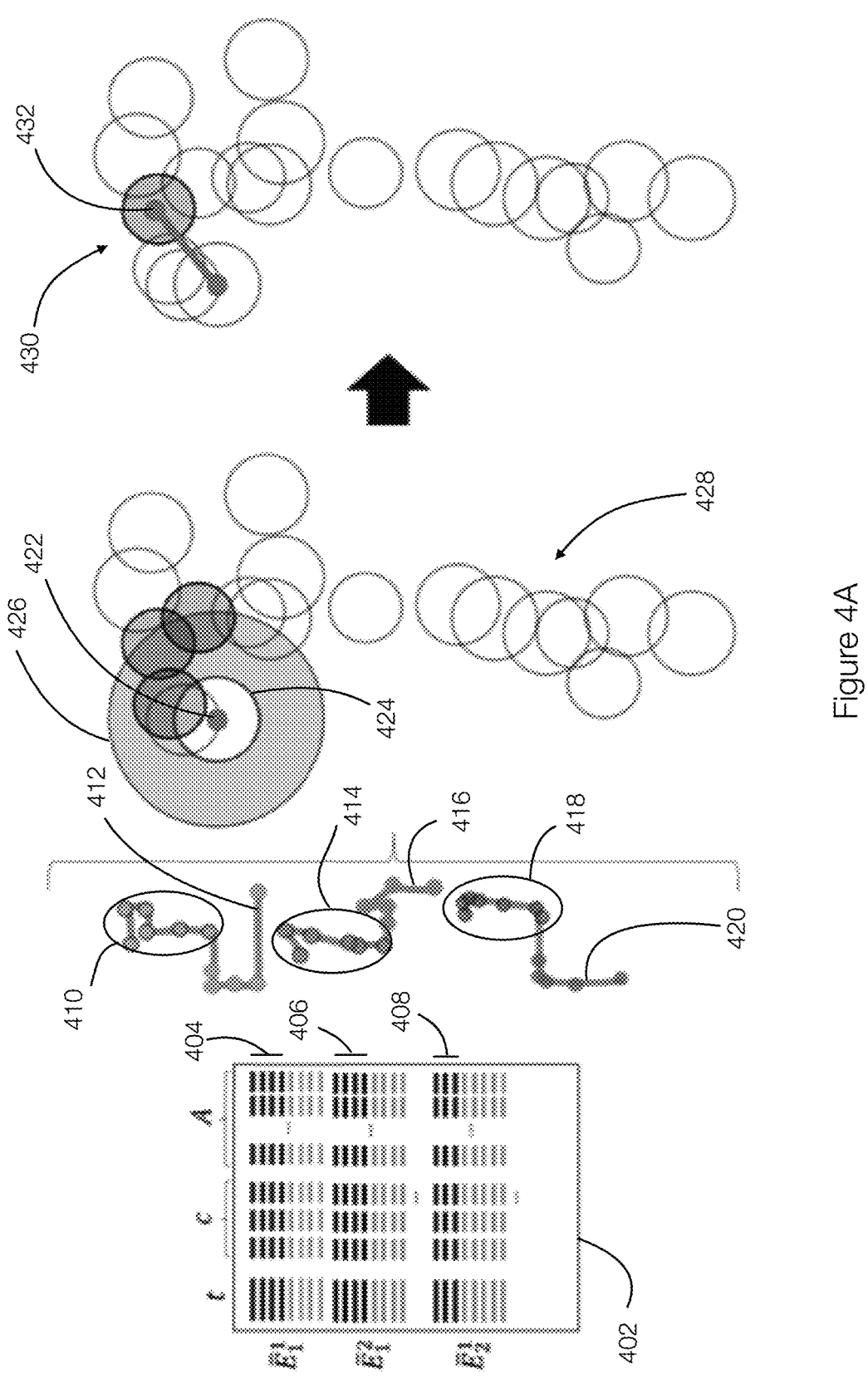
FIGS. 4A, 4B, 4C, and 4D disclose aspects of identifying typical trajectories from candidate sub-trajectories and aspects of rich typical trajectories.
Figure 4B:
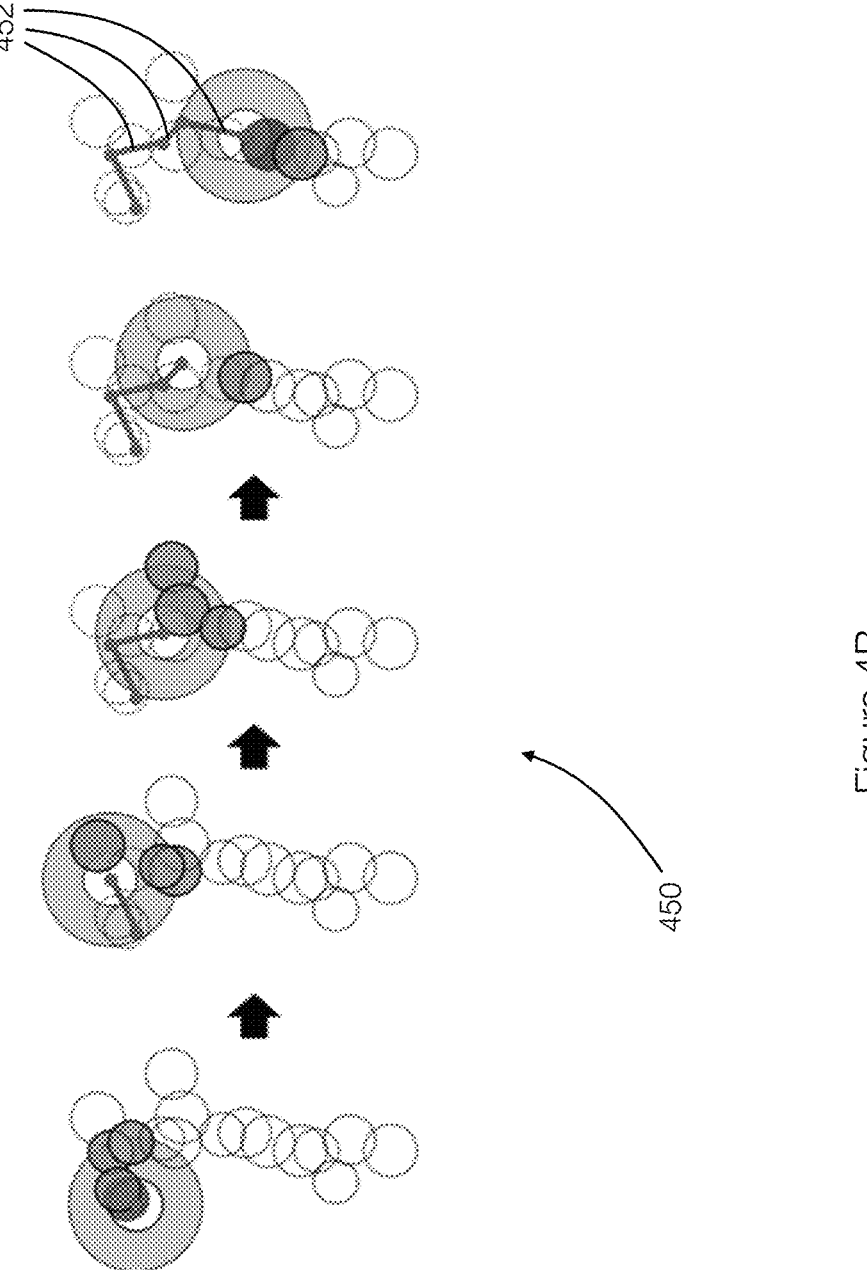
Figure 4C:
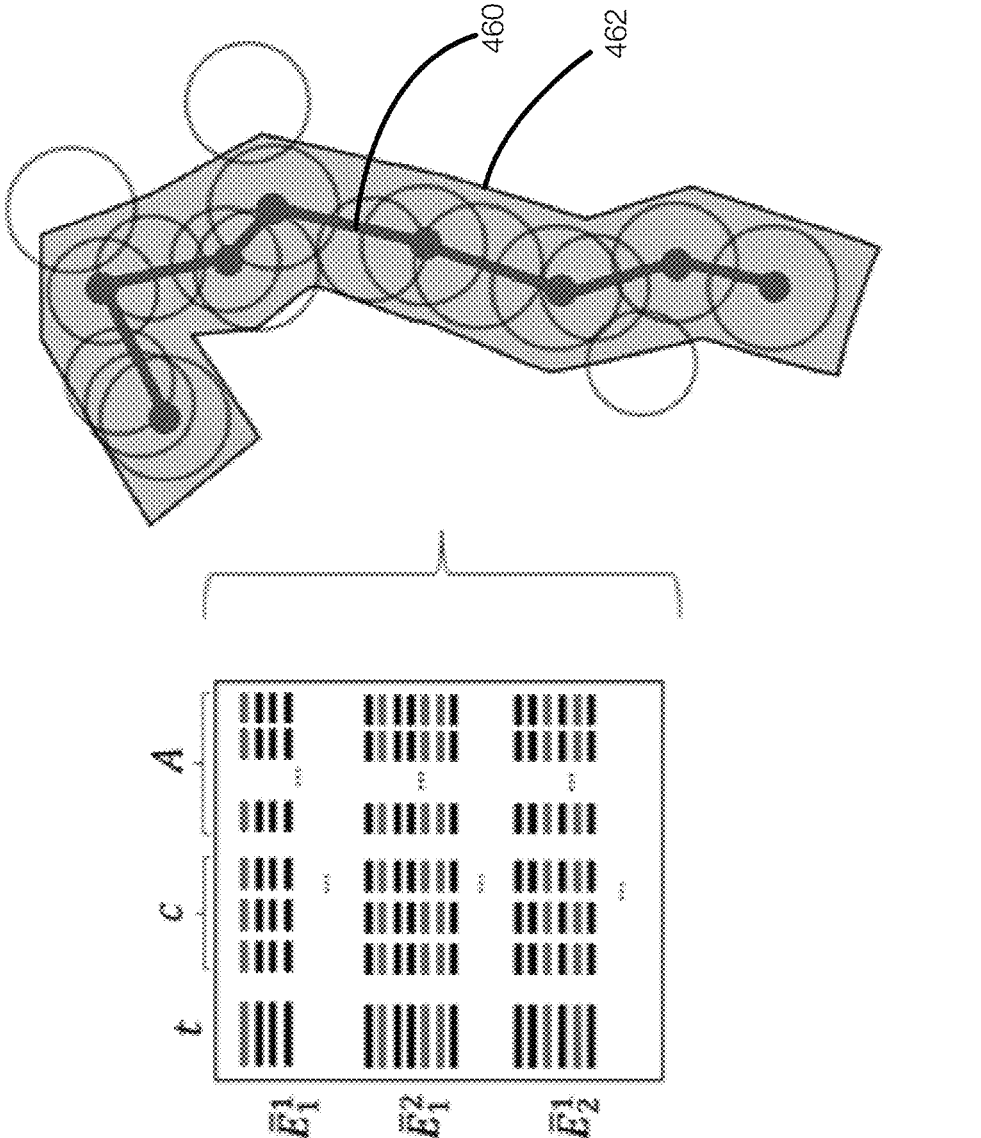

FIGS. 4A, 4B, and 4C illustrate aspects of identifying typical trajectories from candidate sub-trajectories. In one example, sub-trajectories with a relative frequency above a pre-determined threshold k or, alternatively, all sub-trajectories with a support score s above a threshold support score are identified as candidate as candidate sub-trajectories (or candidate trajectories). These trajectories (the overlapping portions) are then processed to determine the a typical trajectory for or that represents the candidate trajectories. In one example, a ring-step method is performed to identify a typical trajectory.

FIG. 4A illustrates sequences 402 of collections. The sequences 402 include collection for nodes $E_1$ and $E_2$. The trajectories 412, 416, and 420 are associated, respectively, with the collections for $E_1^1$, $E_1^2$, and $E_2^1$. The shared portions 410, 414, and 418 of the trajectories 412, 416, and 420 correspond, respectively, to the collections 404, 406, and 408.

Stated differently, FIG. 4A illustrates the collections of trajectories that belong to a sub-trajectory associated with each of the collections 404, 406, and 408.

When determining a typical trajectory from the collections 404, 406, and 408, the positioning and timestamp data (t, c) determines an ordered set of points. These (or selected ones) values (t, c) may constitute center points. In FIG. 4A, the points are represented as circles 428 and the points from each of the relevant collections are at the center of the circles.

In FIG. 4A, a starting point 422 is selected to be a first centerline node. A ring may be associated with a minimum circle 424 and a maximum circle 426. The first iteration of a ring step approach is illustrated at 430, in which a second node 432 is selected.

FIG. 4B discloses additional iterations of the ring step method. The additional iterations 452 in the progression of the ring method 450 illustrate the construction of a typical trajectory that is constructed from the trajectories associated with a shared sub-trajectory.

FIG. 4C illustrates a typical trajectory constructed from a shared sub-trajectory shared by multiple trajectories. In FIG. 4C, the ring-step method results in a typical trajectory that is defined as a center line 460 with a tolerance area 462. An example of a ring method is disclosed in U.S. Pat. No. 17,585,055 filed Jan. 26, 2022, which is incorporated by reference in its entirety.

Figure 4D:
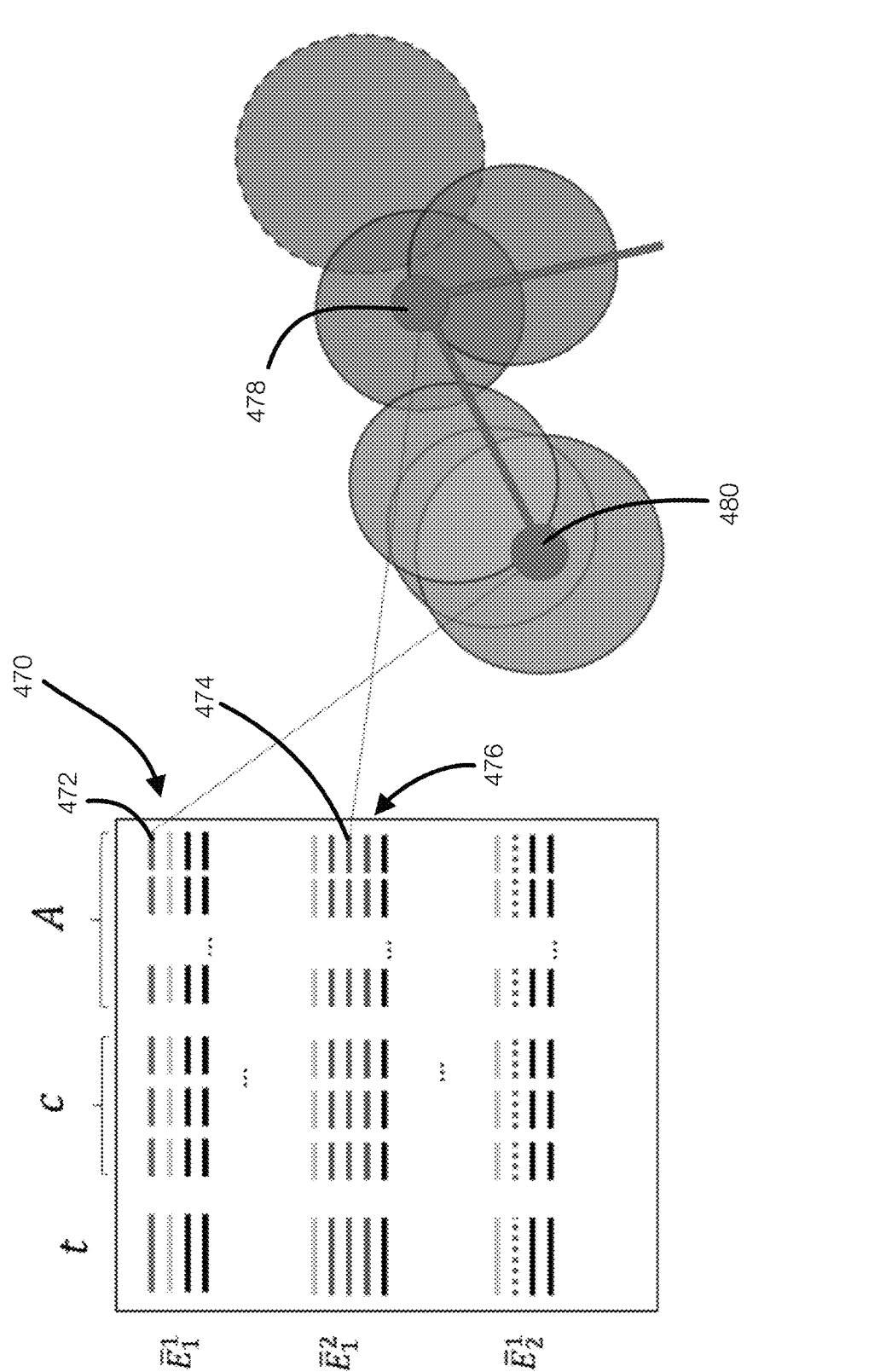

FIG. 4D discloses aspects of rich typical trajectories. Typical trajectories, such as illustrated in FIGS. 4A-4C may be generated and stored in a trajectory database. The typical trajectories are converted to rich typical trajectories by adding information related to the attributes of the points related to the trajectories represented in a typical trajectory.

For each typical trajectory, an additional process of associating aggregate statistics of attributes of interest to the typical trajectories is performed. For each collection in the original data that falls within the tolerance area 462 of the typical trajectory 460 (see FIG. 4C), the closest trajectory node is determined. Points outside the tolerance area 462 may be discarded.

For example, the collection 472 may fall within the tolerance area 462 of the node 480. This allows, in one example, the set of collections 470 to be associated to the node 480. Similarly, the collection 476 may be associated to the node 478 because at least the collection 474 is within the tolerance area of the node 478. In one example, only specific collections are associated to nodes in the typical trajectory. More specifically, only collections within the tolerance area may contribute to the attribute data associated with the typical trajectory.

If one of the attributes in the collections is a speed measurement, taken by velocimeter sensors, one of the aggregation functions may be to take the average speed of all the points related to a node in the typical trajectory. The same attribute could be considered by other aggregation functions, either in isolation or in combination with other attributes. For example, both the average and top speed from among the set of collections can be recorded and associated to the node of the typical trajectory.

In addition to attributes, event frequencies may be associated to the nodes of the typical trajectory. Unlike attributes, which may be derived from sensor data, other rich data generated by models or other rule-based engines in the domain may be associated to the nodes of the typical trajectories.

Figure 5:
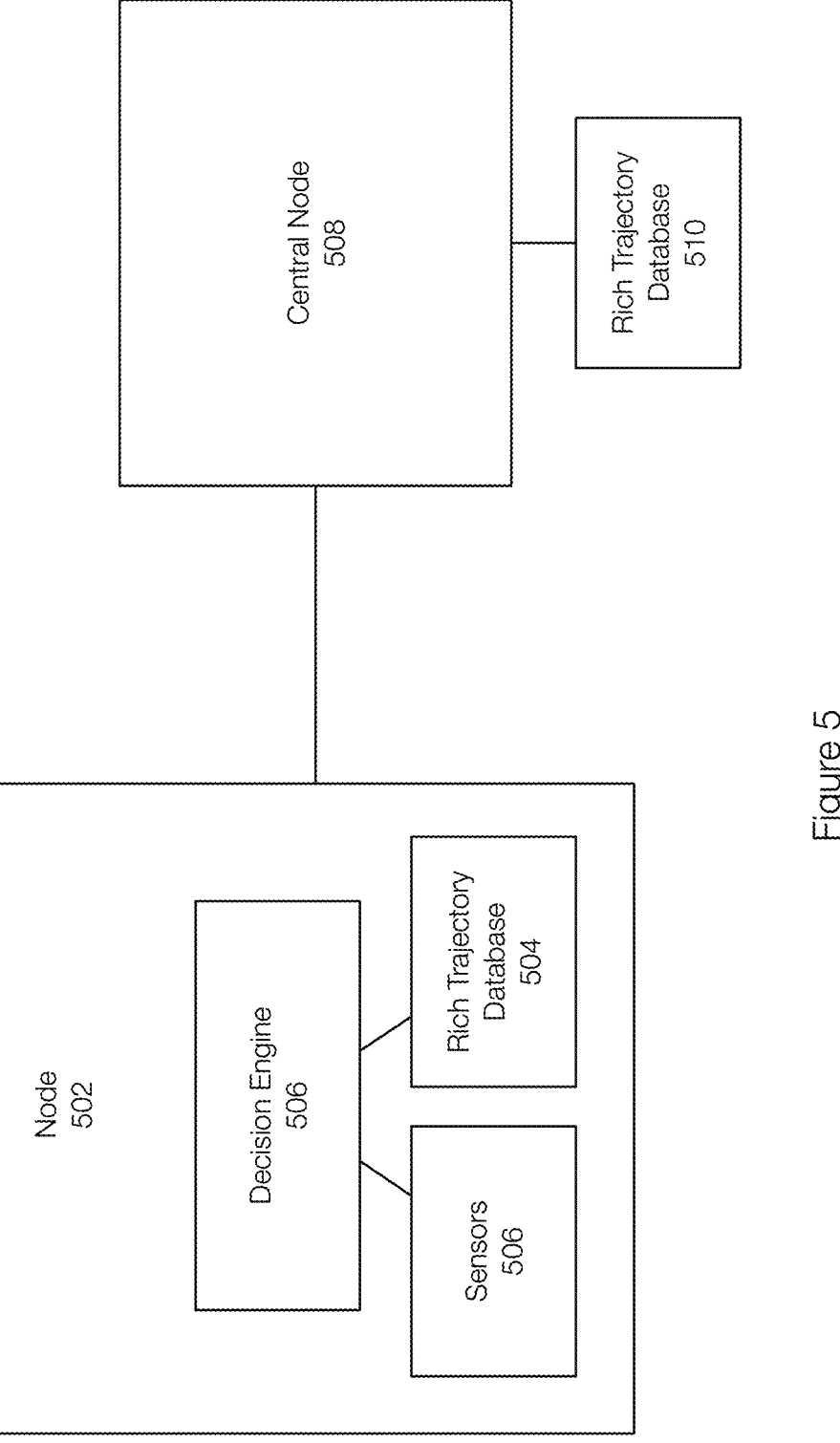
FIG. 5 discloses aspects of querying a rich trajectory base for operations including decision making operations.

FIG. 5 discloses aspects of querying a rich trajectory base for operations including decision making operations. FIG. 5 illustrates a node 502, which may be representative of multiple nodes, in an environment. The node 502 is associated with a central node 508. In this example, the central node 508 has collected various types of information or data from multiple nodes and, as previously discussed, has generated a rich trajectory database 510. In one example, the rich trajectory database 510 is distributed to the node 502 and stored locally as the rich trajectory database 504. The rich trajectory database 504 may be updated based on update operations performed at the central node 508.

The rich trajectory database 504 ( $\mathbb{T}$ ) is based on historical data from multiple nodes. The node 502 may include a logistic engine 506 (or other engine) that may query the rich trajectory database 504 to determine a most likely current trajectory of the node 502 based on a current position of the node 502, previous positions of the node 502, current readings from the sensors 506 and/or previous readings of the sensors 506.

Figure 6:
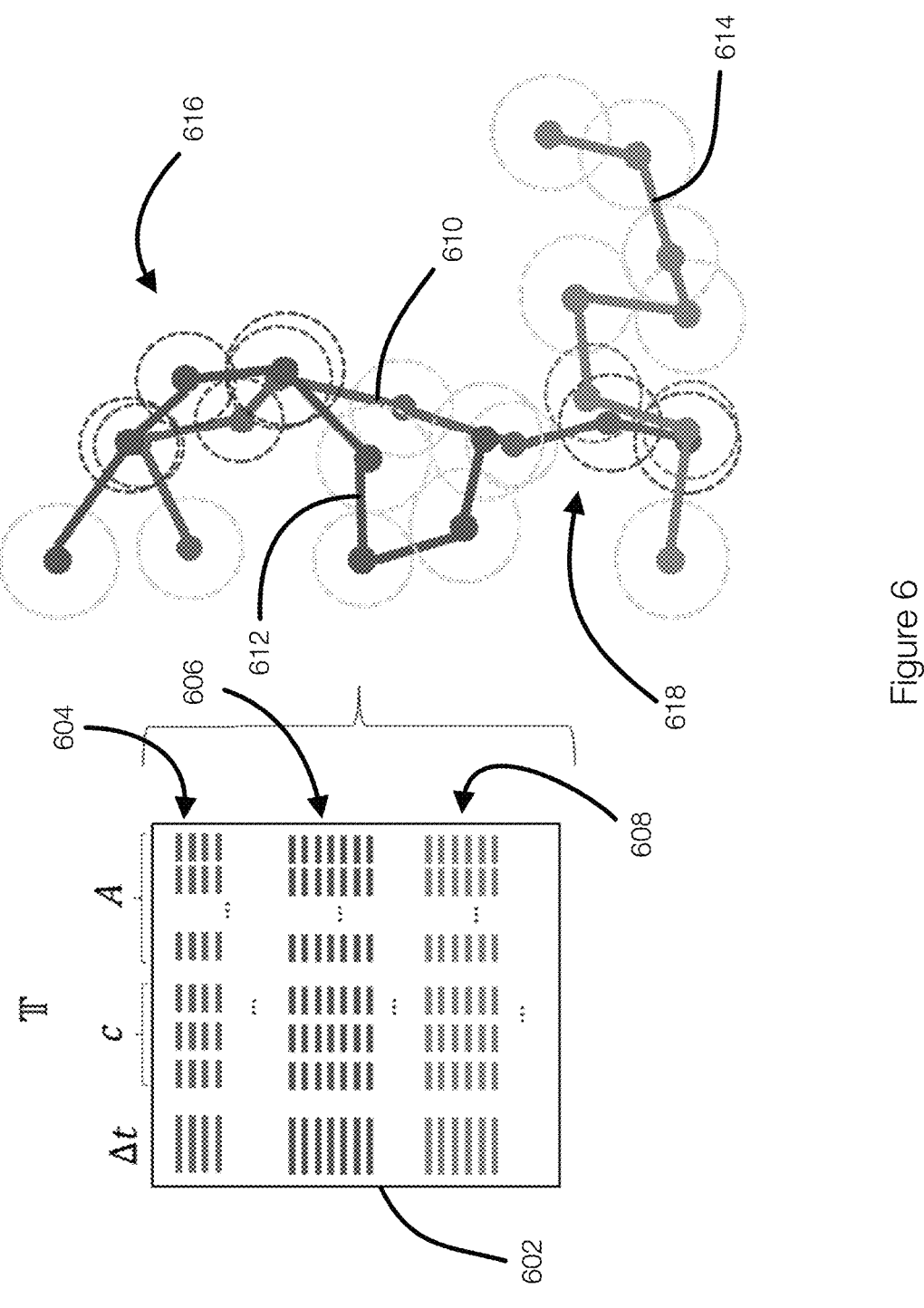
FIG. 6 discloses aspects of rich traditional trajectories.

FIG. 6 discloses aspects of rich typical trajectories. As previously discussed, a rich typical trajectory is derived from a sub-trajectory shared may multiple trajectories. Further, the rich typical trajectory may be associated with a tolerance area. FIG. 6 illustrates a rich typical trajectory database 602 that includes, by way of example, trajectories 610, 612, and 614. The trajectories 610, 612, and 614 are associated with, respectively, collections 604, 606, and 608 in the database 602. The collections 604, for example, define the nodes of the typical rich trajectory 610.

As further illustrated in FIG. 6, the rich typical trajectories 610, 612, and 614 have overlapping portions 616 and 618. Because of the overlapping portions 616 and 618, it is often difficult to determine which typical trajectory is most similar to a current trajectory. Embodiments of the invention thus relate to querying the database 602 in order to identify the typical trajectory that is most similar to the node's current trajectory.

Figure 7A:
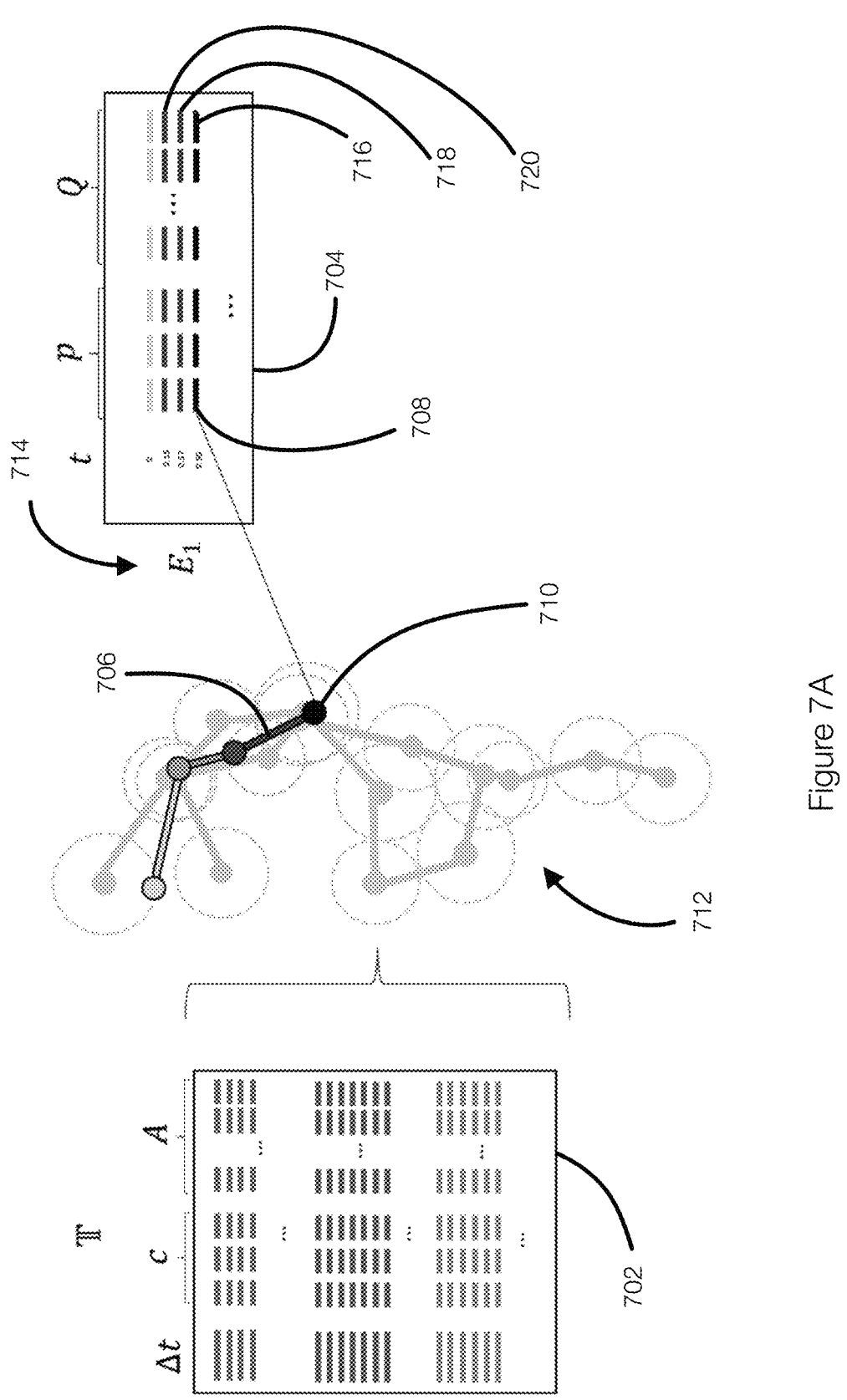
FIGS. 7A, 7B, 7C and 7D disclose aspects of querying a rich trajectory database.

FIG. 7A discloses aspects of querying a rich trajectory database. FIG. 7A illustrates a rich typical trajectory database 702. The corresponding typical trajectories 712 are also illustrated. FIG. 7A also illustrates a sequence 704 of collections that are collected at the node 714 ($E_1$). The collections may include a timestamp, a position, and attributes and each collection is represented as (t, p, Q). As illustrated in FIG. 7A, the current position 710 of the node

714, which has performed a trajectory 706, may be aligned with more than one typical trajectory stored in the database 702. Further, adopting a closest-point at each observed position of the node 714 may result in inconsistent behavior and cause the node 714 to alternate between various typical trajectories as previously described. Embodiments of the invention query the database 702 to reduce or eliminate this behavior and for other reasons.

Part of the process of selecting a rich typical trajectory based on the current node trajectory or path may include selecting candidate rich typical trajectories from the database 702. In this example, the most recent collection 716 may include a position and attributes for or associated with the node 714, which is represented at ($p_0$, $Q_0$). In this example, ($p_1$, $Q_1$) represents a previous position and attributes for the collection 718. Similarly, ($p_2$, $Q_2$) represents the position and attributes of a collection 720, which is earlier in time to the collections 718 and 716.

When a newly available ($p_0$, $Q_0$) of the node 714 is available, the database 702 is filtered by $p_0$ to obtain a set of candidate trajectories ($T_C$). In one example, the filtering is based on only the positioning data p.

Figure 7B:
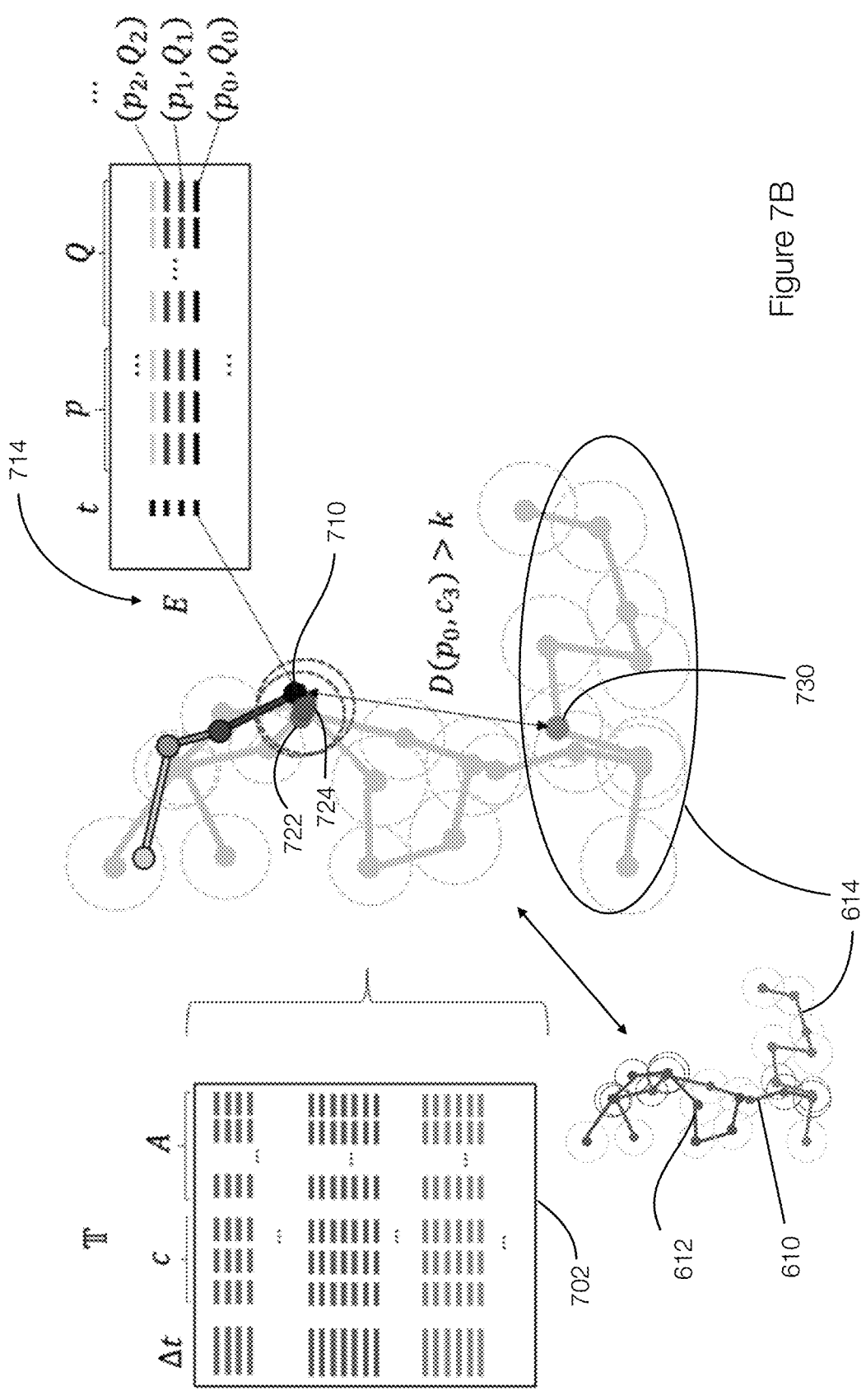

FIG. 7B discloses aspects of querying a rich trajectory database. In FIG. 7B, the typical trajectories 610, 612, and 614 from FIG. 6 are illustrated in small and larger versions and are represented in the database 702.

When filtering by the position ($p_0$) in this example, a threshold distance k may be defined. The closest points to $p_0$ in each of the typical trajectories stored in the database 702 are determined from the database 702. In this example, the closest point from the trajectory 610 to the position 710 ($p_0$) of the node 714 is the point 722. The closest point from the trajectory 612 is the point 724. The closest point from the trajectory 614 is the point 730. However, because the distance between the point 730 and the point 710 is greater than the threshold D ($p_0$, point 730)>k, the trajectory 614 is discarded.

More generally, the node 714 searches for the closest point $c_i$ to $p_0$ in each trajectory $T_i \in T$. If $D(p_0, c_i)$>k, then that trajectory is discarded and is not considered to be a candidate trajectory at least for the current query. In one example, the rich trajectory data may be associated with or to a map structure that indexes the points by position. This allows the querying of the database 702 for a closest point from a set of points efficiently.

This query may return a set of candidate typical trajectories ($T_C$). From each of the typical trajectories returned by the query, a restricted number of points are extracted and compared to the most recent points extracted from a current path or trajectory of the node 714. In one example, a same number of q comparison points is determined.

Figure 7C:
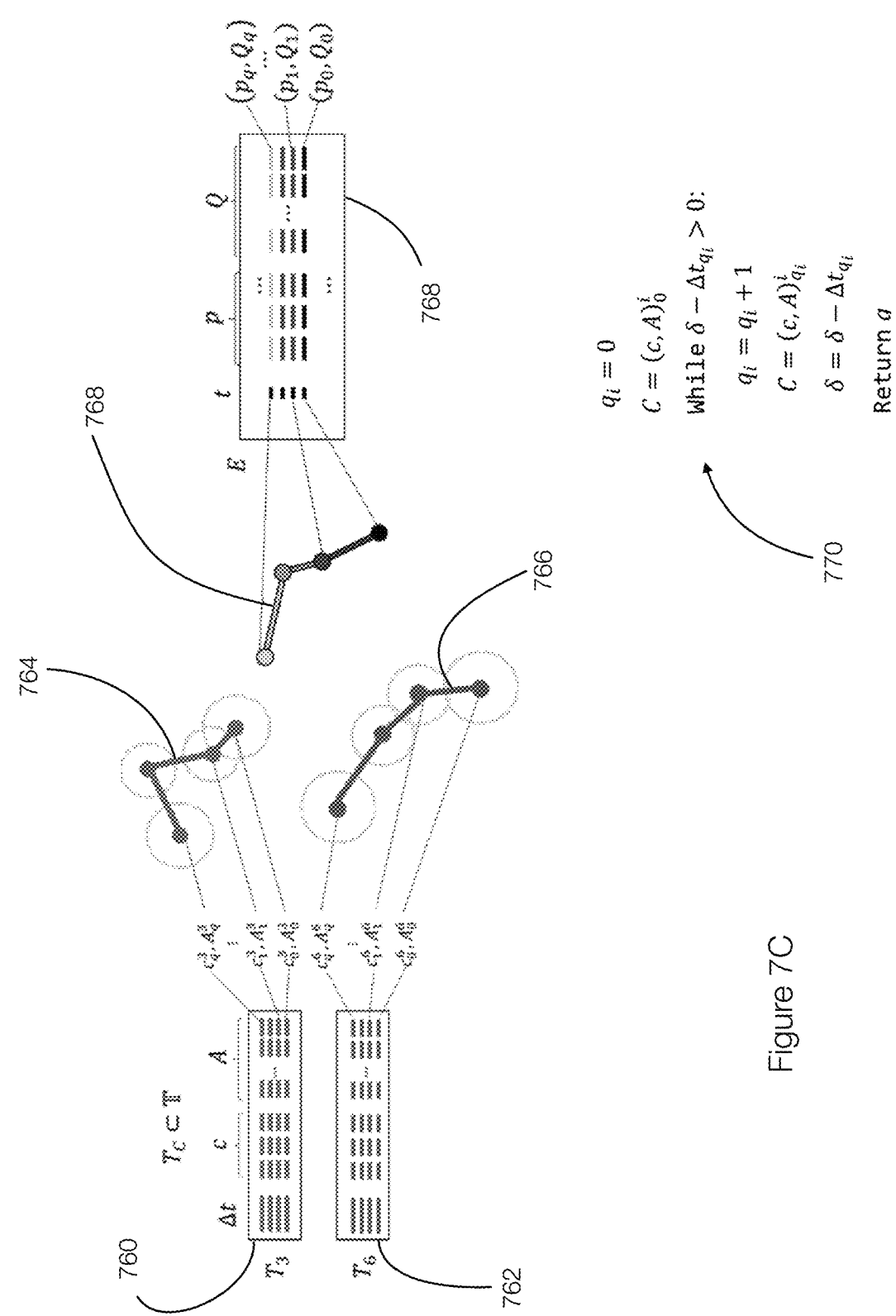

FIG. 7C discloses aspects of comparing a current node trajectory or path to typical trajectories. In FIG. 7C, the trajectories 764 and 768 correspond to the candidate typical trajectories $T_C$ (candidate trajectories 610 and 612 in FIG. 7B) and are labeled as the trajectory $T_3$ and the trajectory $T_6$ in FIG. 7C These trajectories correspond to the collections of data 760 and 762 from the typical trajectory database 702. The trajectory 768 corresponds to a current path or trajectory of the node 714. Each of the trajectories 764, 766, and 768 illustrate q points for comparison purposes.

In FIG. 7C, the points $c_j^i$, $A_j^i$ of each trajectory $T_i \in T_C$, with $0 \le j \le q$, are extracted for comparison with points from the collections 768 (q collections of (p, Q)). In one example, the candidate trajectories have the same number of points as the current path of the node 714, which is applicable when the time between points (p, A) is regular and/or similar to the average Δt in the rich typical trajectories.

Otherwise, a mechanism for selecting a variable number of points from each candidate trajectory is performed. By way of example, given a value of q, $\delta = t_1 - t_q$ is obtained. In this example, $t_i$ is a timestamp associated to $(p, A)_i$. To determine the number of points from each candidate trajectory, a point selection method 770 illustrated in FIG. 7C is then performed for each trajectory $T_i$. The method 770 returns a number $j_i$ of points to be obtained from one or more of the candidate trajectories.

Figure 7D:
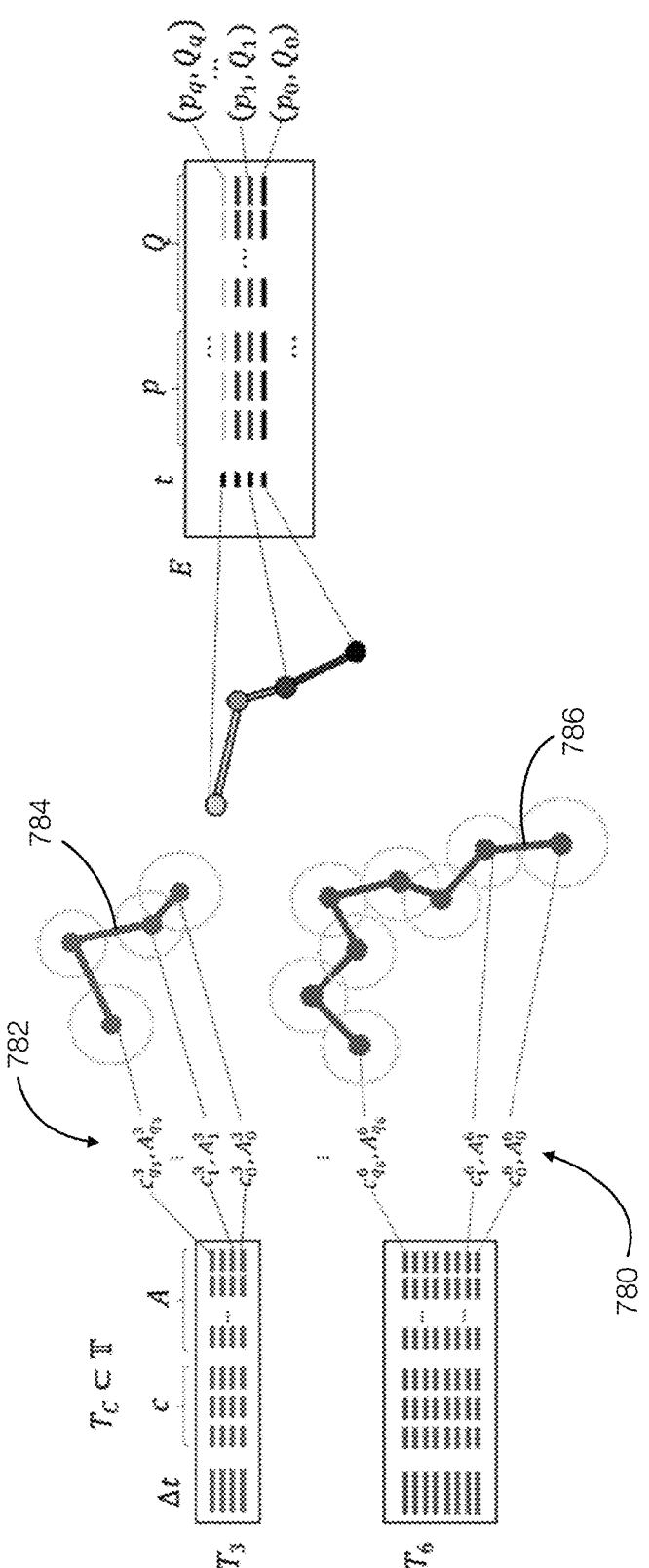

FIG. 7D discloses an example of points returned from the point selection method. As illustrated in FIG. 7D, the number of points 780 for the candidate trajectory $T_6$ is greater than q. In this example, the number of points 782 for the candidate trajectory $T_3$ is equal to q.

Once the candidate trajectories have been determined, a similarity score between each point (p, Q) from the node's current path or trajectory and a set of aligned points from the candidate trajectories $T_C$ is determined.

The similarity score may include a similarity scoring or distance function $F(A, Q) \to \mathbb{R}$ that considers attribute importance and/or a discount factor $\gamma$ that may relate the relative importance of the node's past positions for determining the node's current trajectory. The value $\gamma$ may be defined in a domain-dependent manner and is typically a fraction $(0 \leq \gamma \leq 1)$.

Figure 8A:
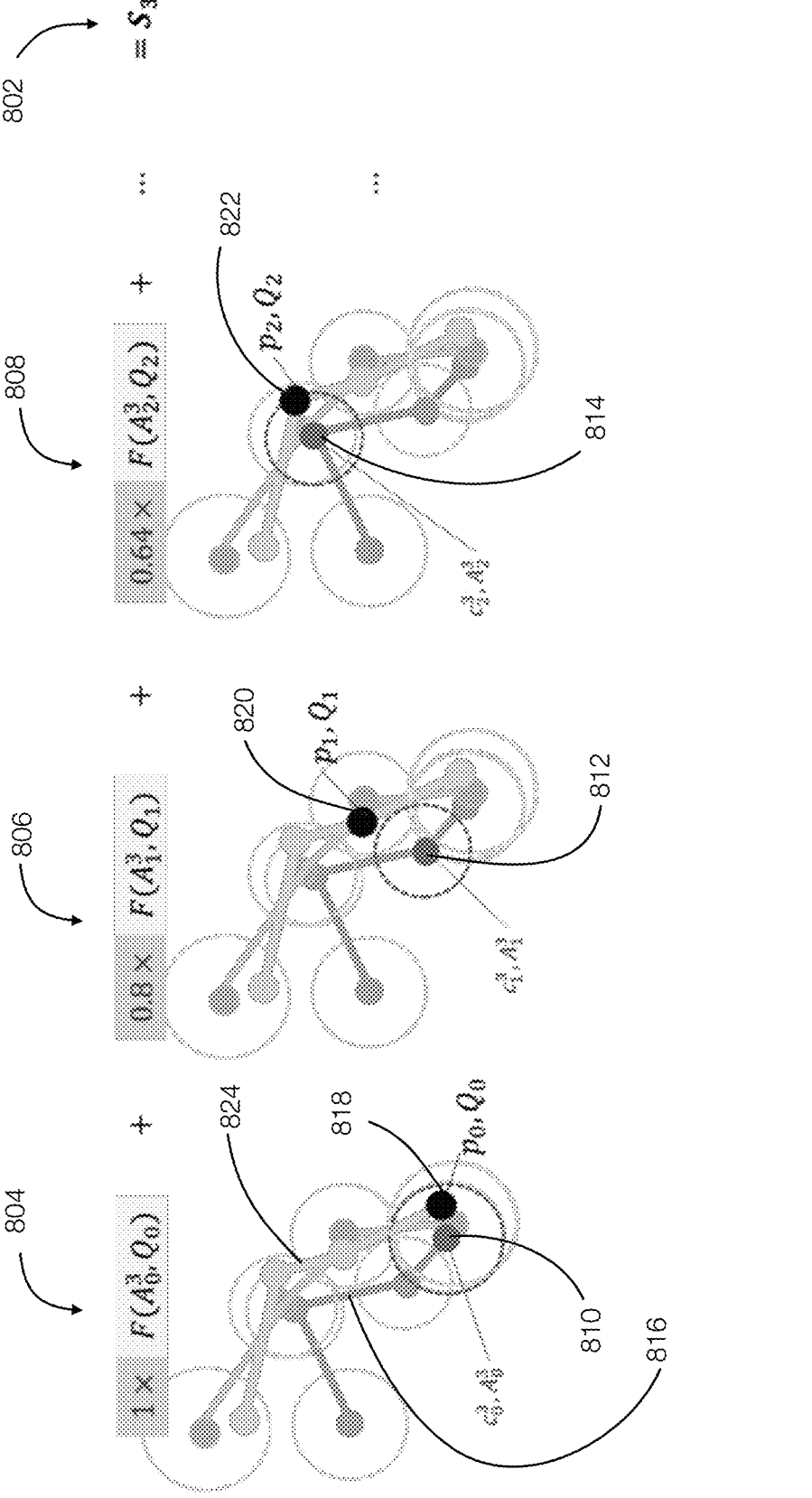
FIGS. 8A, 8B, 8C, and 8D disclose aspects of scoring the similarity of candidate trajectories to a node's current trajectory.

FIG. 8A discloses aspects of determining a similarity score for a candidate trajectory. In one example, the similarity score $S_i$ for a trajectory $T_i$ is defined as follows:

$$S_i = \sum_{j=0}^{q} (1 - \gamma)^j F\left(A_j^i, Q_j\right).$$

In this example, the number of points in the trajectory 816 is equal to the number of points in the node's trajectory 824, which is (q=4) in this example. FIG. 8A illustrates an example of determining a trajectory score $S_3$ 802 for the candidate trajectory $T_3$ 816 (also illustrated in FIG. 7D as candidate trajectory 784). Each point of the trajectory contributes to the similarity score 802.

For example, the score 804 for the point $(p_0, Q_0)$ 818 is based on the point 810 from the candidate trajectory 816. Similarly, the scores 806 and 808 are determined, respectively, for the points 820 and 822 from the respective points 812 and 814. Each of the scores 804, 806, and 808 is weighted by the discounting factor $\gamma$. Further, the discounting factor $\gamma$ may be different in each of the terms or scores 804, 806, and 808.

The function F in this example may vary. In one example, a difference function may be used in which case a candidate with a minimum difference is selected, as opposed to one with maximum similarity. In one example, this function should consider the relative importance of the attributes. A general form for this type of determination of computation may be a weighted sum of element-wise absolute differences as follows:

$$F(A, Q) = \frac{1}{|A|} \sum_{n=0}^{|A|} A[n] \times |A[n] - Q[n]|.$$

In this example, $A = [A_0, A_1, \ldots]$ and $A$ defines a weight for each attribute in the domain. A[n] or Q[n] denotes the nth element in A or Q. In one example, the value is averaged with respect to the number of attributes in the domain. In some examples, the weight of each attribute may be determined on a per-task basis. For example, if a trajectory is being selected for purposes of detecting a dangerous cornering event, the attributes of interest may be the attributes that relate to the speed of the node (or the average speed for that point, in the case of typical trajectories). In an example where $A$ is not defined and/or all attributes have the same weight, a straightforward distance function may be used.

Figure 8B:
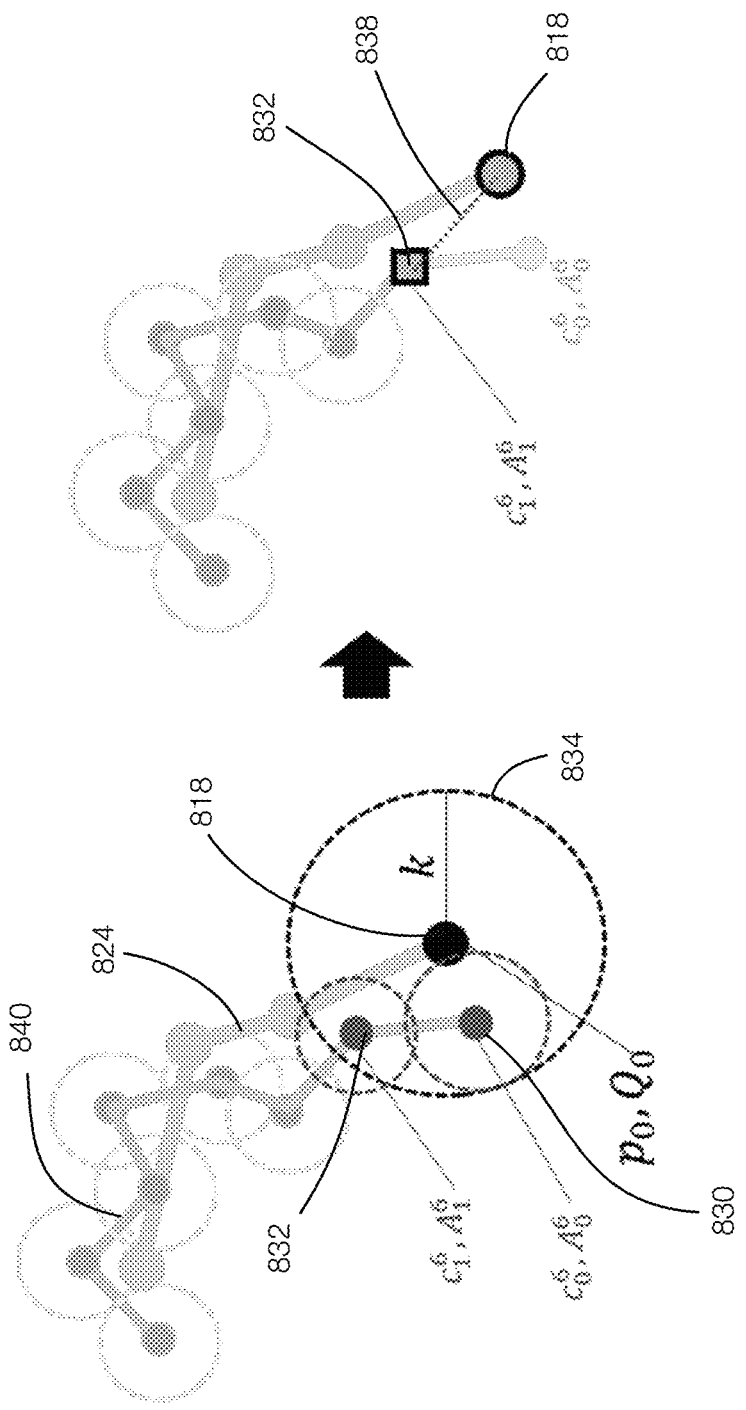

FIG. 8B discloses aspects of determining a similarity score for a candidate trajectory where the number of points in the candidate trajectory is not equal to the number of points in the node's trajectory. In other words, FIG. 8B discloses aspects of determining a similarity score for a candidate trajectory with non-matching points.

FIG. 8B illustrates the trajectory 824 of the node and the candidate trajectory 840 ($T_6$) (shown as candidate trajectory 786 in FIG. 7D). As illustrated in FIG. 8B, test points for evaluating the point 818 ($(p_0, Q_0)$ are based on a maximum distance threshold 834, represented as $d(p_0, c_j^i) < k$.

A point $(p_z, Q_z)$, where z=0 initially, of the node's path is selected. All points 832 and 830 $(c_j^i, A_j^i)$ within the maximum distance 834 are selected for testing. The threshold may be parameterized but may be similar to the threshold used in selecting candidate trajectories.

In the first iteration, a point close to $p_z$ is obtained. As this is the first point, the point $p_0$ is selected. In this example, the points 830 and 832 are selected because they are within the distance 834. The similarities $F(A_j^i, Q_z)$ are determined for each of these points 830, and 832. The point with the greatest similarity (or smallest difference) is anchored to the point $p_z$, which is $p_0$ in this specific example. As illustrated in FIG. 8B (right side of the Figure), the point 832 is anchored to the point 818 after testing the points 830 and 832 because the point 830 had a better similarity. The anchored pair (points 818 and 832) and their similarity (e.g., difference) are stored. Next, z is incremented and the process is repeated.

Figure 8C:
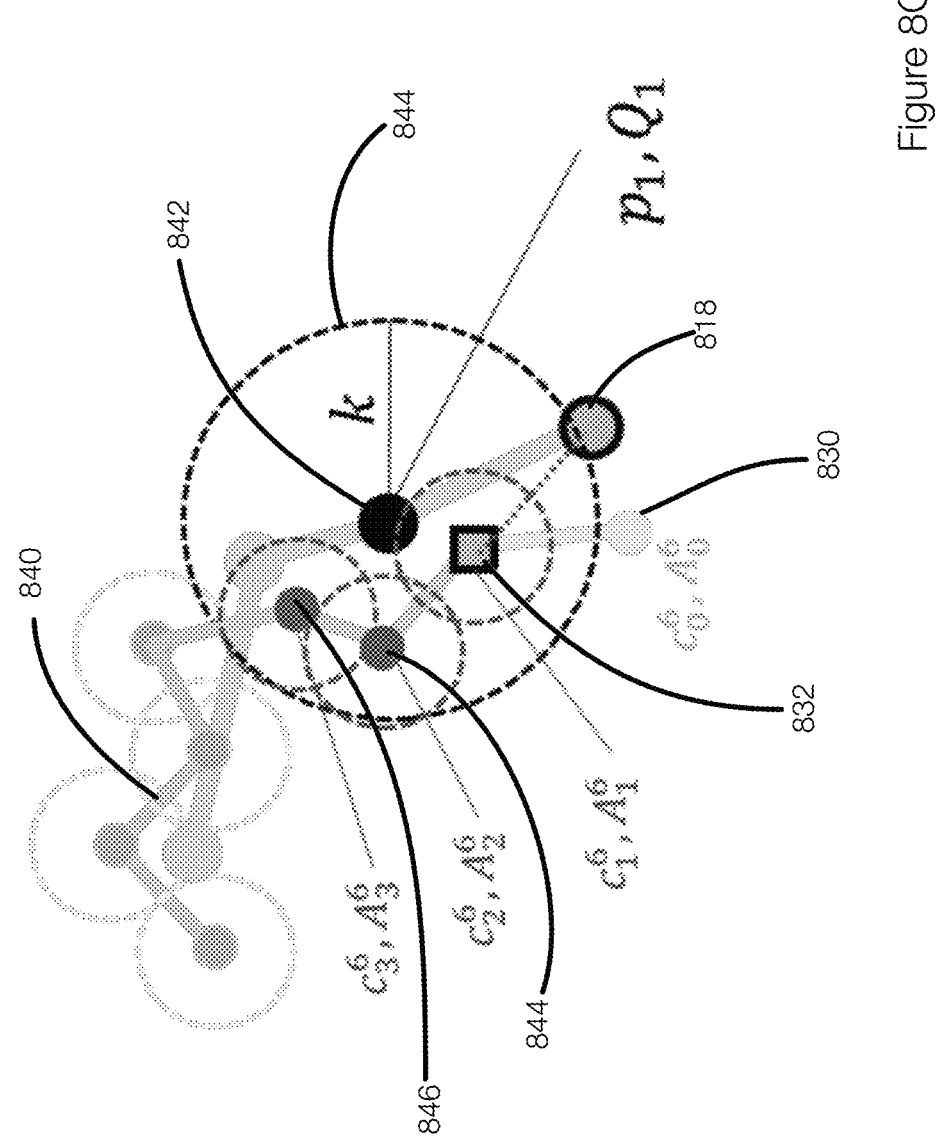

FIG. 8C discloses aspects of selecting a point to anchor to a point in the node's path or trajectory. FIG. 8C illustrates the selection of test points for the next point 842 ($p_1, Q_1$) in the node's path. The test points 846, 844, and 832 fall within the distance threshold 844 of the point 842. In this example, all points $(c_l^i, A_l^i)$ whose index l is smaller than the anchored point are disregarded. Thus, the point 830 from the trajectory 840 is disregarded in this iteration for the point 842.

In this example, the point 832, which was also considered in evaluating the point 818 in FIG. 8B, is also considered while evaluating the point 842. This ensures that at least one selected point will be available for computing the similarity score. Further, this allows a sequence of extracted points to be anchored to a smaller sequence of points. Embodiments of the invention do not require any look-ahead determinations to ensure that a similarity score can be computed.

Figure 8D:
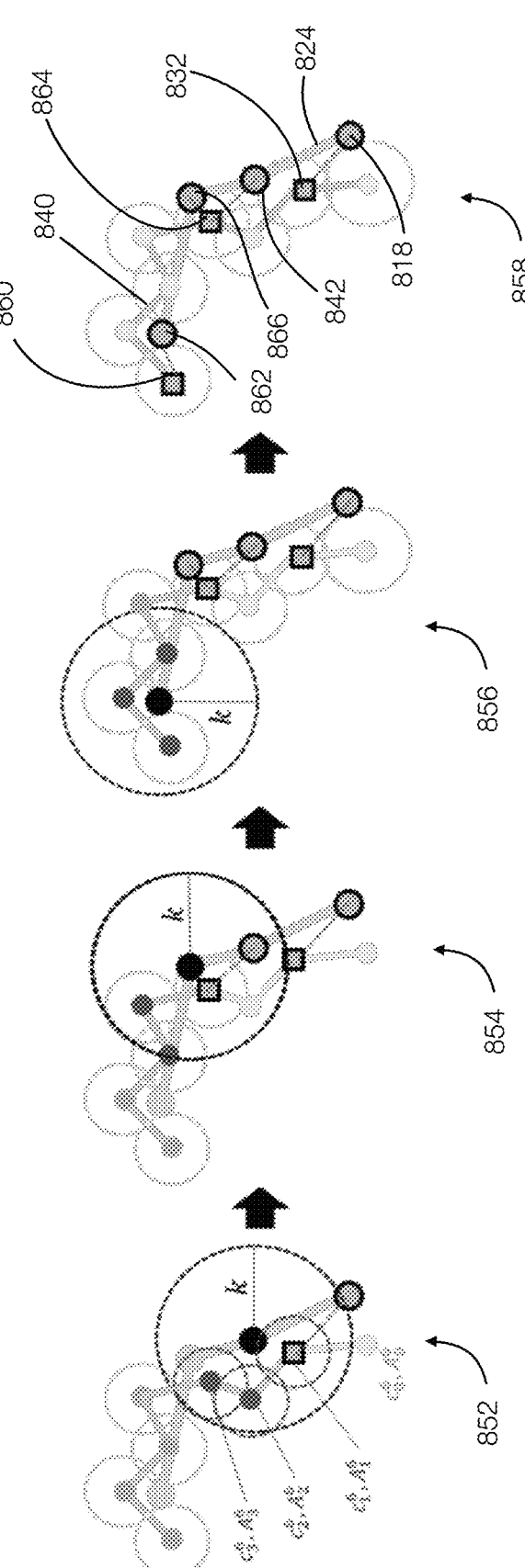

The remaining iterations are performed in a similar manner for the trajectory 840. FIG. 8D illustrates examples of these iterations. FIG. 8D illustrates that determining the anchor points for the node's path included four iterations 852, 854, 856, and 858. In this example and as illustrated in the iteration 858, the points 818, 842, 866, and 862 of the node's path or trajectory 824 were anchored, respectively, to points 832, 864, 864, and 860 of the candidate trajectory 840. In this example, both of the points 842 and 866 were mapped to the same point 864 of the candidate trajectory 840.

When the anchoring process is completed a matching series of q points from both the candidate trajectory 840 and the node's current path 824 are obtained. The similarity score can then be determined. A similar process may be performed for the remaining candidate trajectories. The final trajectory selected from the candidate trajectories is the one that has the best similarity score. Because weighted similarity scores have been determined, the logistic engine or node is less likely to switch to other candidate trajectories each time a new position is determined and the method repeated is desired.

Embodiments of the invention thus allow a structure of rich trajectories collected from operational data to be queried to provide improved temporal coherence. Embodiments of the invention allow a rich typical trajectory to be selected based on the similarity score, which accounts for the attributes of the node's current path. These attributes are extracted from available sensor readings in the domain and may include sensors directly associated with the node and/or present in the environment or domain.

FIG. 9 discloses aspects of querying a database of rich trajectories or of performing a logistics operation such as identifying a likely trajectory of the node that can be used for making decisions or other logistics operations.

The method 900 includes selecting 902 rich trajectories from a rich trajectory database. A rich trajectory database includes typical trajectories that have been augmented with attribute data. A typical trajectory may be representative of multiple actual trajectories. As previously described, trajectories can be evaluated and segmented. A typical trajectory may correspond to portions of overlapping trajectories. These overlapping portions can be evaluated to determine a typical trajectory that may be associated with a tolerance area, as illustrated in FIG. 4C for example.

Selecting 902 rich candidate trajectories may include identifying these typical trajectories from a trajectory database. In one example, selecting 902 candidate trajectories may be performed based on positioning data. Generally, candidate trajectories include trajectories that include a point within a threshold distance to a point in the node's current path or, more specifically, the node's current position or most recent position.

Next, a number of comparison points are determined 904 from the node's current path. This number may be set by default or may be domain specific. Next, comparison points are extracted 906 from the candidate trajectories. The number of points extracted from each of the candidate trajectories may be the same or different from the number of comparison points from the node's current path.

A similarity score 908 is determined for each of the candidate trajectories The similarity score may include a function that includes attribute importance and a discount factor denoting the relative importance of past positions of the node for determining the node's current trajectory. In one example, anchor points in the candidate trajectory may be determined prior to generating the similarity score. A similarity score may be determined for each point from the candidate trajectory or each anchor point. The similarity scores from each of the points may be summed for each candidate trajectory. The final similarity scores can be used to return a final typical trajectory in response to the query.

More specifically, once the similarity scores are determined, a final trajectory is selected 910 based on the similarity scores. The final trajectory may be adopted as the most likely current trajectory of the node. Because this process reflects the trajectories and attributes in a weighted manner, embodiments of the invention are more likely to select the best candidate trajectory the expected or likely trajectory. This allows, decision making operations (or other actions) to be performed 912 based on the final trajectory. Further, querying the database the node is less likely to switch between multiple potential trajectories, which as previously described can have an adverse impact on logistics operations. Queries can be performed repeatedly such that the most likely trajectory can be updated as desired.

Embodiments of the invention thus allow trajectories to be queried for similarity and allow logistics operations to be performed based on the most similar trajectory.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistics operations, trajectory related operations, querying operations, similarity operations, scoring operations, decision making operations, and the like. More generally, the scope of the invention embraces any operating environment in which the disclosed concepts may be useful.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform services, execute functions, store data, or the like and may include elements of the operating environment.

Example cloud computing environments, which may or may not be public, include storage environments that may provide functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines, containers, or virtual machines (VMs), though no particular component implementation is required for any embodiment.

Example embodiments of the invention are applicable to any system capable of storing and handling various types of objects/data, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples.

In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: querying a database of trajectories, by a requestor, by: selecting candidate trajectories from a database of trajectories, extracting comparison points from each of the candidate trajectories to compare with comparison points from a current trajectory of a node, determining a similarity score for each of the candidate trajectories, and identifying a final trajectory based on the similarity scores of the candidate trajectories, and returning the final trajectory to the requestor.

Embodiment 2. The method of embodiment 1, further comprising generating the database of trajectories, wherein the database of trajectories include rich typical trajectories, wherein each rich typical trajectory includes a typical trajectory that is associated with attribute data and wherein each typical trajectory represents a collection of trajectories.

Embodiment 3. The method of embodiment 1 and/or 2, wherein selecting candidate trajectories includes selecting the candidate trajectories based only on positioning data.

Embodiment 4. The method of embodiment 1, 2, and/or 3, wherein the candidate trajectories include typical trajectories that include a point within a threshold distance from a point of the current trajectory of the node.

Embodiment 5. The method of embodiment 1, 2, 3, and/or 4, wherein determining a similarity score for each of the candidate trajectories includes executing a similarity scoring function that considers attribute importance.

Embodiment 6. The method of embodiment 1, 2, 3, 4, and/or 5, further comprising weighting the similarity scoring function with a discount factor.

Embodiment 7. The method of embodiment 1, 2, 3, 4, 5, and/or 6, wherein the discount factor denotes a relative importance of past positions of the node.

Embodiment 8. The method of embodiment 1, 2, 3, 4, 5, 6, and/or 7, further comprising determining anchoring points when a number of the comparison points extracted from a candidate trajectory is different from a number of the comparison points from the current trajectory of the node.

Embodiment 9. The method of embodiment 1, 2, 3, 4, 5, 6, 7, and/or 8, wherein an anchoring point may be associated with more than one of the comparison points from the current trajectory of the node.

Embodiment 10. The method of embodiment 1, 2, 3, 4, 5, 6, 7, 8, and/or 9, further comprising performing logistics operations based on the final trajectory, the logistics operations including decision making operations.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, agent, engine, component, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
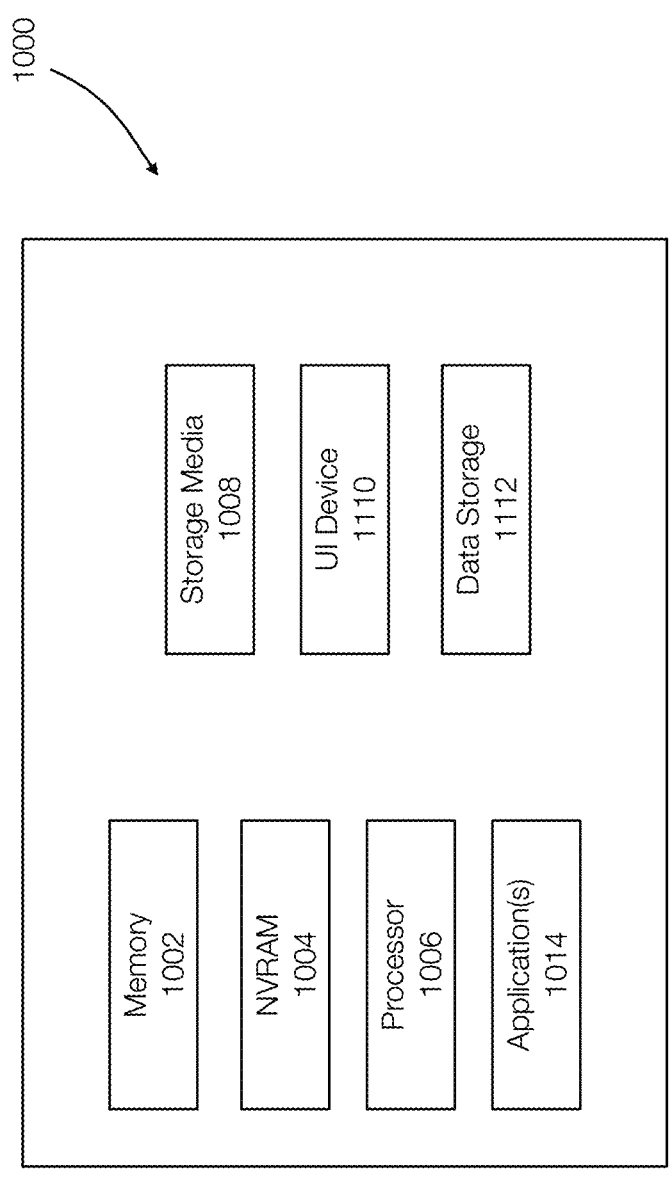
FIG. 10 discloses aspects of a computing device, system, or entity.

With reference briefly now to FIG. 10, any one or more of the entities disclosed, or implied, by the Figures, and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining an anticipated trajectory of a node currently operating in an environment for logistics operations, the method comprising:

repeatedly:

querying a database of trajectories to select candidate trajectories from the database of trajectories, wherein the database of trajectories includes trajectories of multiple nodes;

extracting comparison points from each of the candidate trajectories to compare with comparison points from a current trajectory of the node, wherein the comparison points from each of the candidate trajectories and the comparison points from the current trajectory relate to positions;

determining a similarity score for each of the candidate trajectories, wherein the candidate trajectories are weighted based on attributes and/or characteristics of the node, and wherein the similarity score includes a discount factor representing a relative importance of past trajectory points;

identifying a final trajectory based on the similarity scores of the candidate trajectories; and returning the final trajectory to the requestor, wherein the final trajectory is the anticipated trajectory of the node; and performing the logistics operations in the environment for the node based on the anticipated trajectory of the node, wherein performing the logistics operations comprises controlling a real-world object associated with the node to make decisions in accordance with the anticipated trajectory, wherein the anticipated trajectory is selected from among a set of rich typical trajectories representing clusters of historical trajectories associated with metadata describing node context, environmental conditions, and task attributes.

2. The method of claim 1, further comprising generating the database of trajectories, wherein the database of trajectories include rich typical trajectories, wherein each rich typical trajectory is generated by clustering a set of historical trajectories and associating the resulting cluster with aggregate attribute metadata, and wherein each typical trajectory represents a collection of trajectories that share spatial and/or temporal coherence.

3. The method of claim 1, wherein selecting candidate trajectories includes selecting the candidate trajectories based only on positioning data.

4. The method of claim 3, wherein the candidate trajectories include typical trajectories that include a point within a threshold distance from a point of the current trajectory of the node.

5. The method of claim 1, wherein determining a similarity score for each of the candidate trajectories includes executing a similarity scoring function that considers attribute importance.

6. The method of claim 5, further comprising applying a temporal discount factor to weight the similarity scoring function, wherein the discount factor is a decay function applied to historical comparison points based on their age relative to a current position of the node.

7. The method of claim 6, wherein the discount factor denotes a time-decay coefficient that reduces the contribution of older comparison points in the trajectory when computing similarity scores, and wherein the decay function is non-linear and based on exponential or logarithmic functions of elapsed time.

8. The method of claim 1, further comprising determining anchoring points when a number of the comparison points extracted from a candidate trajectory is different from a number of the comparison points from the current trajectory of the node.

9. The method of claim 8, wherein an anchoring point is associated with more than one of the comparison points from the current trajectory of the node.

10. The method of claim 1, wherein the logistics operations including decision making operations.

11. A non-transitory storage medium having stored therein instructions that are executable by one or more hardware processors to perform operations for determining an anticipated trajectory of a node currently operating in an environment for logistics operations, the operations comprising:

repeatedly:

querying a database of trajectories to select candidate trajectories from the database of trajectories, wherein the database of trajectories includes trajectories of multiple nodes;

extracting comparison points from each of the candidate trajectories to compare with comparison points from a current trajectory of the node, wherein the comparison points from each of the candidate trajectories and the comparison points from the current trajectory relate to positions;

determining a similarity score for each of the candidate trajectories, wherein the candidate trajectories are weighted based on attributes and/or characteristics of the node, and wherein the similarity score includes a discount factor representing a relative importance of past trajectory points;

identifying a final trajectory based on the similarity scores of the candidate trajectories; and returning the final trajectory to the requestor, wherein the final trajectory is the anticipated trajectory of the node; and performing the logistics operations in the environment for the node based on the anticipated trajectory of the node, wherein performing the logistics operations comprises controlling a real-world object associated with the node to make decisions in accordance with the anticipated trajectory, wherein the anticipated trajectory is selected from among a set of rich typical trajectories representing clusters of historical trajectories associated with metadata describing node context, environmental conditions, and task attributes.

12. The non-transitory storage medium of claim 11, further comprising generating the database of trajectories, wherein the database of trajectories include rich typical trajectories, wherein each rich typical trajectory is formed by grouping multiple historical trajectories using a similarity-based clustering algorithm, and associating aggregate metadata including environmental, operational, and node-specific attributes to the clustered trajectories.

13. The non-transitory storage medium of claim 11, wherein selecting candidate trajectories includes selecting the candidate trajectories based only on positioning data.

14. The non-transitory storage medium of claim 13, wherein the candidate trajectories include typical trajectories that include a point within a threshold distance from a point of the current trajectory of the node.

15. The non-transitory storage medium of claim 11, wherein determining a similarity score for each of the candidate trajectories includes executing a similarity scoring function that considers attribute importance.

16. The non-transitory storage medium of claim 15, further comprising applying a temporal discount factor within the similarity scoring function, wherein the discount factor is applied to comparison points based on their temporal distance from a current position in the node's trajectory.

17. The non-transitory storage medium of claim 16, wherein the discount factor denotes a time-based weighting function that exponentially reduces the impact of older trajectory points, and wherein the function dynamically adjusts based on real-time operational context.

18. The non-transitory storage medium of claim 11, further comprising determining anchoring points when a number of the comparison points extracted from a candidate trajectory is different from a number of the comparison points from the current trajectory of the node.

19. The non-transitory storage medium of claim 18, wherein an anchoring point is associated with more than one of the comparison points from the current trajectory of the node.

20. The non-transitory storage medium of claim 11, wherein the logistics operations including decision making operations.

* * * * *